US006934069B2

(12) United States Patent
Moon et al.

(10) Patent No.: US 6,934,069 B2
(45) Date of Patent: Aug. 23, 2005

(54) CHROMATIC DISPERSION COMPENSATION DEVICE HAVING AN ARRAY OF MICROMIRRORS

(75) Inventors: John A. Moon, Wallingford, CT (US); Alan D. Kersey, Glastonbury, CT (US); Jay W. Dawson, Livermore, CA (US); Joseph Pinto, Wallingford, CT (US); James R. Dunphy, Glastonbury, CT (US); Michael A. Davis, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 198 days.

(21) Appl. No.: 10/298,264

(22) Filed: Nov. 15, 2002

(65) Prior Publication Data

US 2003/0174939 A1 Sep. 18, 2003

Related U.S. Application Data

(63) Continuation-in-part of application No. 10/120,617, filed on Apr. 11, 2002, and a continuation-in-part of application No. 10/115,647, filed on Apr. 3, 2002.
(60) Provisional application No. 60/332,318, filed on Nov. 16, 2001, provisional application No. 60/281,079, filed on Apr. 3, 2001, provisional application No. 60/311,002, filed on Aug. 8, 2001, provisional application No. 60/332,319, filed on Nov. 16, 2001, provisional application No. 60/365,741, filed on Mar. 18, 2002, provisional application No. 60/365,461, filed on Mar. 18, 2002, and provisional application No. 60/283,197, filed on Apr. 11, 2001.

(51) Int. Cl.[7] .......................... G02B 26/00; H04J 14/02; H04B 10/12
(52) U.S. Cl. .......................... 359/290; 398/81; 398/79; 398/147
(58) Field of Search .................. 359/290, 301, 359/302, 315, 318, 320, 618, 629, 634, 639, 850, 872, 223, 224, 291; 398/79, 81, 147; 385/11, 15–18, 24, 1–3, 31

(56) References Cited

U.S. PATENT DOCUMENTS 4,626,066 A  12/1986  Levinson
(Continued)

FOREIGN PATENT DOCUMENTS

EP  1205781 A1  5/2002

OTHER PUBLICATIONS

V. Aksyuk et al., "Low insertion loss packaged and fibre connectorised MEMS reflective optical switch", pp. 1413–1414, Electronic Letters, Jul. 9th, 1998, vol. 34, No. 14.

(Continued)

*Primary Examiner*—Hung Xuan Dang
*Assistant Examiner*—Joseph P. Martinez
(74) *Attorney, Agent, or Firm*—Ware, Fressola, Van Der Sluys & Adolphson LLP

(57) ABSTRACT

A chromatic dispersion compensation device selectively delays a respective portion of spectral sections of each respective optical channel of an optical WDM input signal to compensate each optical channel for dispersion compensation, and includes a spatial light modulator having a micromirror device with a two-dimensional array of micromirrors. The micromirrors tilt or flip between first and second positions in a "digital" fashion in response to a control signal provided by a controller in accordance with a switching algorithm and an input command. A collimator, diffraction gratings, and Fourier lens collectively collimate, disperse and focus the optical input channels onto the array of micromirrors. Each optical channel is focused onto micromirrors of the micromirror device, which effectively pixelates the optical channels. To compensate an optical channel for chromatic dispersion, a portion of the spectral sections of each channel is delayed a desired time period by tilting an array of mirrors (i.e., spectral array) disposed in each spectral section at different spatial positions on the micromirror device.

44 Claims, 31 Drawing Sheets

U.S. PATENT DOCUMENTS

| | | | |
|---|---|---|---|
| 4,790,566 A | | 12/1988 | Boissier et al. |
| 4,799,795 A | | 1/1989 | Fateley |
| 4,819,084 A | | 4/1989 | Bark |
| 5,121,239 A | | 6/1992 | Post |
| 5,158,420 A | | 10/1992 | Weyer |
| 5,166,766 A | | 11/1992 | Grudkowski et al. |
| 5,208,880 A | | 5/1993 | Riza et al. |
| 5,312,513 A | | 5/1994 | Florence et al. |
| 5,504,575 A | | 4/1996 | Stafford |
| 5,699,462 A | | 12/1997 | Fouquet et al. |
| 5,729,386 A | | 3/1998 | Hwang |
| 5,745,260 A | | 4/1998 | Blazey |
| 5,774,604 A | | 6/1998 | McDonald |
| 5,822,222 A | | 10/1998 | Kaplinsky et al. |
| 5,870,173 A | | 2/1999 | Oberhardt et al. |
| 5,915,063 A | | 6/1999 | Colbourne et al. |
| 5,923,036 A | | 7/1999 | Tague, Jr. et al. |
| 6,061,171 A | | 5/2000 | Taylor et al. |
| 6,128,077 A | | 10/2000 | Jovin et al. |
| 6,160,928 A | | 12/2000 | Schroeder |
| 6,204,946 B1 | * | 3/2001 | Aksyuk et al. ............... 398/9 |
| 6,222,954 B1 | | 4/2001 | Riza |
| 6,246,818 B1 | | 6/2001 | Fukushima |
| 6,249,365 B1 | | 6/2001 | Mizrahi et al. |
| 6,263,123 B1 | | 7/2001 | Bishop et al. |
| 6,263,127 B1 | | 7/2001 | Dragone et al. |
| 6,275,322 B1 | | 8/2001 | Tai |
| 6,310,993 B1 | * | 10/2001 | Cao et al. ................... 385/24 |
| 6,344,910 B1 | | 2/2002 | Cao |
| 6,434,291 B1 | | 8/2002 | Kessler et al. |
| 6,459,484 B1 | | 10/2002 | Yokoi |
| 6,525,863 B1 | | 2/2003 | Riza |
| 2001/0046350 A1 | | 11/2001 | Tedesco |
| 2002/0009257 A1 | | 1/2002 | Bouevitch et al. |
| 2002/0034356 A1 | | 3/2002 | Tew |
| 2002/0044722 A1 | | 4/2002 | Tew |
| 2002/0067887 A1 | | 6/2002 | Tomlinson et al. |
| 2002/0071627 A1 | | 6/2002 | Smith et al. |
| 2002/0081070 A1 | | 6/2002 | Tew |

FOREIGN PATENT DOCUMENTS

| | | |
|---|---|---|
| EP | 1211534 A2 | 6/2002 |
| WO | 0101611 A3 | 1/2001 |

OTHER PUBLICATIONS

T. Bergman et al., "Variable Optical Attenuator And Optical Multiplexing Subsystem Integration, Control, and Application", pp. 954–962, National Fiber Optic Engineers Conference, 2001 Technical Proceedings.

L. Zhang et al., Optical Node For Ultra–Long–Haul Backbone Networks, pp. 43–46, National Riber Optics Engineers Conference, 2001 Technical Proceedings.

N.A. Riza et al., "Fault–tolerant dense multiwavelength add–drop filter with a two–dimensional digital micromirror device", pp. 6355–6361, Applied Optics, vol. 37, No. 27, Sep. 20, 1998.

L.Y. Line et al., "Free–Space Micromachined Optical Switches with Submillisecond Switching Time for Large–Scale Optical Crossconnects", pp. 525–527, IEEE Photonics Technology Letters, vol. 10, No. 4, Apr. 1998.

M. F. Dautartas et al., "A Silicon–Based Moving–Mirror Optical Switch", pp. 1078–1085 Journal of Lightwave Technology, vol. 10, No. 8, Aug. 1992.

N. A. Riza et al., "Two Dimensional Digital Micromirror Device–based 2×2 Fiber–Optic Switch Array", pps 413–414, 11th Annual Mtg., IEEE LAsers and Electro–Optics, Dec. 1998.

N. A. Riza et al., "Fault–tolerant polarization–insensitive photonic delay line architectures using two–dimensional digital micromirror devices", pp. 312–321, Optics Communications, Nov. 29, 1998.

N. A. Riza et al., "Versatile multi–wavelength fiber–optic switch and attenuator structure using mirror manipulations", pp. 1–11, Optics Communications, Jul. 6, 1999.

S. Glöckner et al., "Micro–opto–mechanical beam deflectors", pp. 1339–1345, Optical Engineering, May 1997.

J. E. Ford et al., "Dynamic Spectral Power Equalization Using Micro–Opto–Mechanics", pp. 1440–1442, IEEE Photonics Technology Letters, vol. 10, No. 10, Oct. 1998.

B. Barber et al., "A Fiber Connectorized MEMS Variable Optical Attenuator", pp. 1262–1264, IEEE Photonics Technology Letters, vol. 10, No. 9, Sep. 1998.

Press Release, "Onetta Releases Technical Paper On Dynamic Gain Equalization And Its Role In Creating Economic Value For Network Service Providers", Sunnyvale, CA Jul. 16, 2001.

"Onetta Shipping 'Smart' Amplifiers," Light Reading–The Global Site For Optical Networking, Mar. 5, 2001.

Press Releases, "Onetta Releases 'Smart' Amplifiers Creating the New 'Intelligent' Optical Engines' Product Category", San Jose, CA, Mar. 5, 2001.

N. A. Riza et al., "Small Tilt Micromirror Device–Based Multiwavelength Three Dimensional 2×2 Fiber–Optic Switch Structures," pp. 1–18 and Figure Captions, including Figs. 1–12, The School of Optics and Center For Research and Education in Optics and Lasers (CREOL), Published in the SPIE Journal Optical Engineering circa 1999/Early 2000.

S. Yuan et al., "General Formula for Coupling–loss Characterization of Single–Mode Fiber Collimators by Use of Gradient–Index Rod Lenses", Applied Optics, vol. 38. No. 15, May 20, 1999, pp. 3214–3222.

N. Riza, "Reconfigurable Optical Wireless", IEEE Lasers and Electro–Optics Society 1999 Annual Meeting, vol. 1, pp. 70–71.

N. Riza et al., "Digitally Controlled Fault–Tolerant Multiwavelength Programmable Fiber–Optic Attenuator Using a Two–Dimensional Digital Micromirror Device", 1999 Optical Society of America.

N. Riza et al., "Multiwavelength Three Dimensional 2×2 Fiber–Optic Switch Structure Using Small Tilt Micro–Mirrors", SPIE vol. 3749, pps 470–471.

G. Love, "Liquid–crystal Phase Modulator For Unpolarized Light", Applied Optics, vol. 32, No. 13, May 1 1993, pps 2222–2223.

N. Riza et al., "Synchronous Amplitude and Time Control for an Optimum Dynamic Range Variable Photonic Delay Line", Applied Optics, vol. 38, No. 11, Apr. 10, 1999, 2309–2318.

N. Riza et al., "Robust Packaging of Photonic RF Modules Using Ultra–Thin Adaptive Optical Interconnect Devices", SPIE vol. 3160, pps. 170–176.

N. Riza et al., "Demonstration of a Liquid-crystal Adaptive Alignment Tweeker for High-Speed Infrared Band Fiber-Fed Free-space Systems", Opt. Eng. 37(6), Jun. 1998, 1876–1880.

M. D. Johnson et al., "Two-axis Micromirror Scanner", SPIE vol. 3787, Jul. 1999, pps. 88–95.

H. Laor et al., "Performance of a 576×576 Optical Cross Connect", National Fiber Optic Engineers Conference, Sep. 26–30, 1999, pps. 276–281.

* cited by examiner

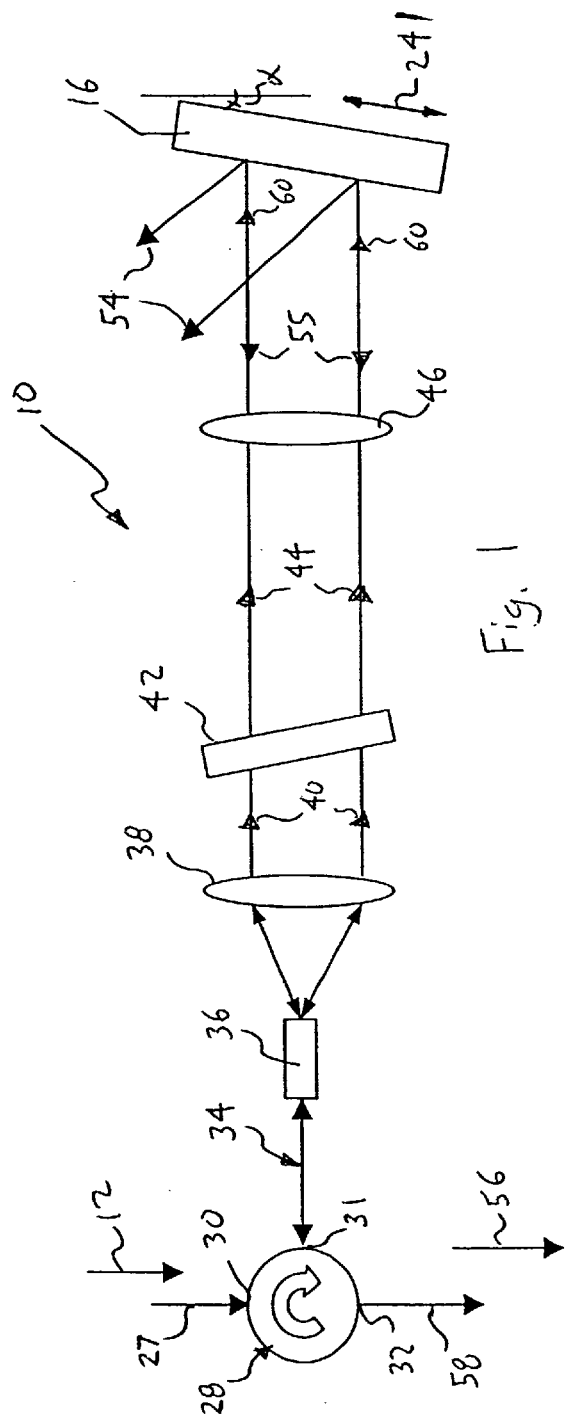
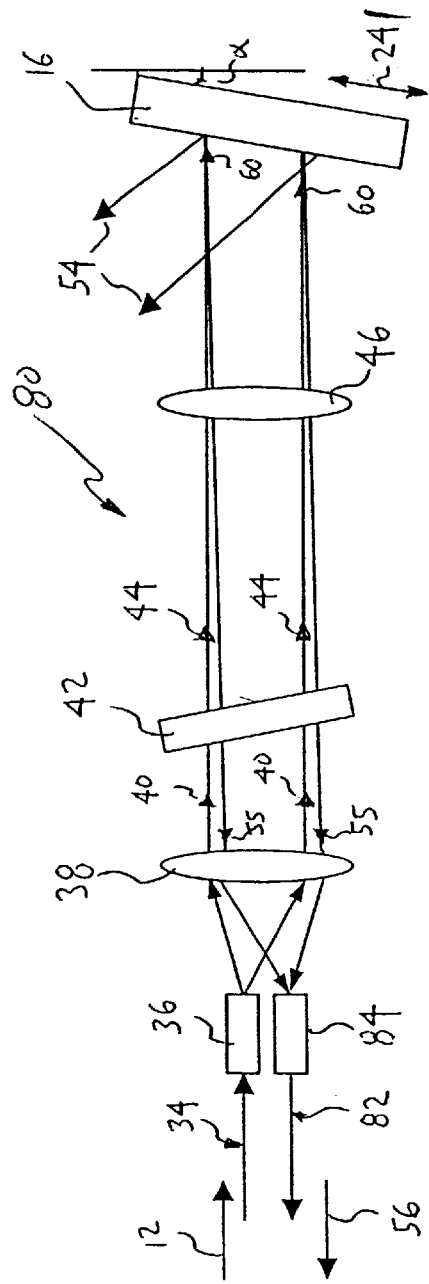

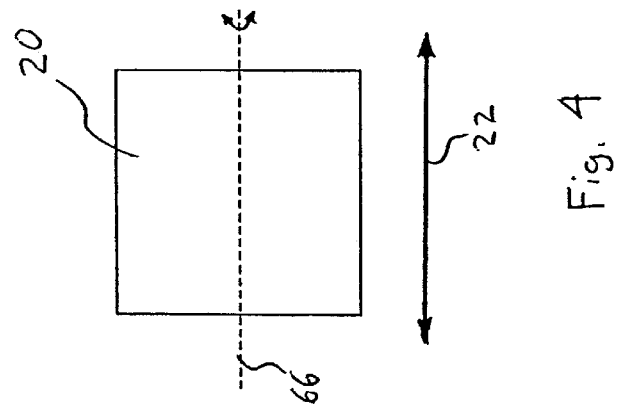
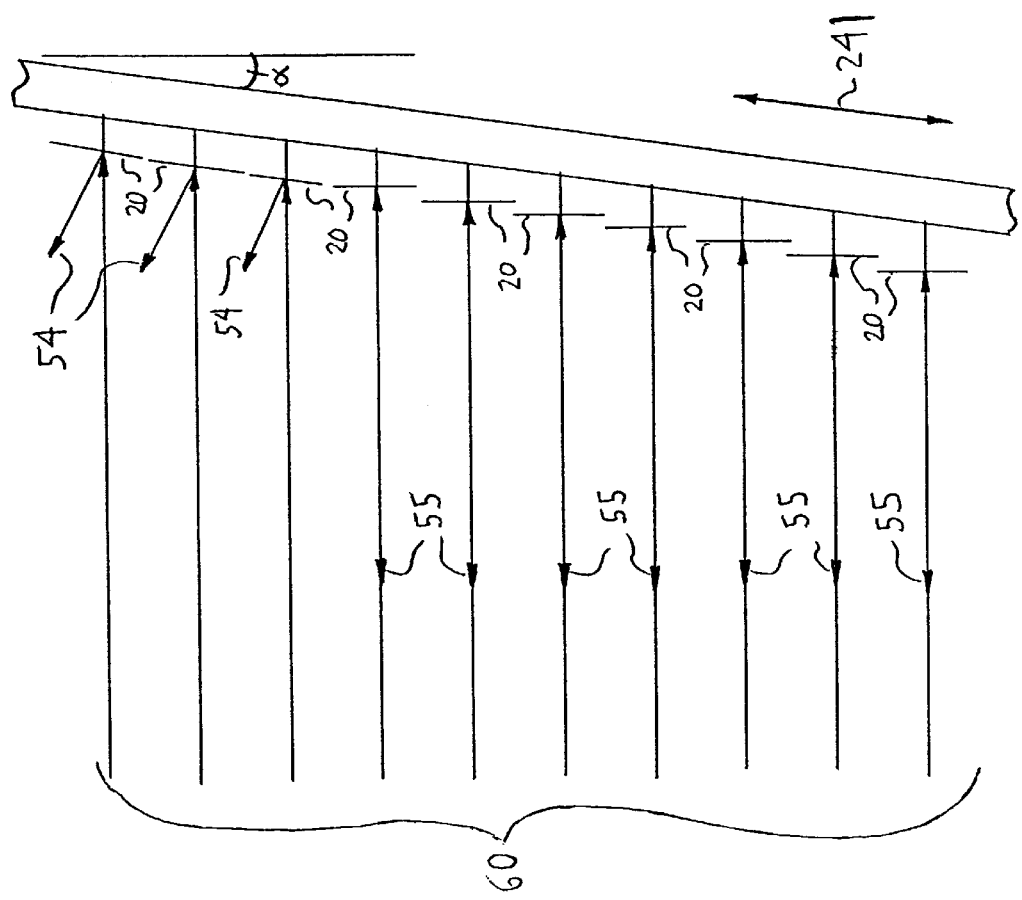

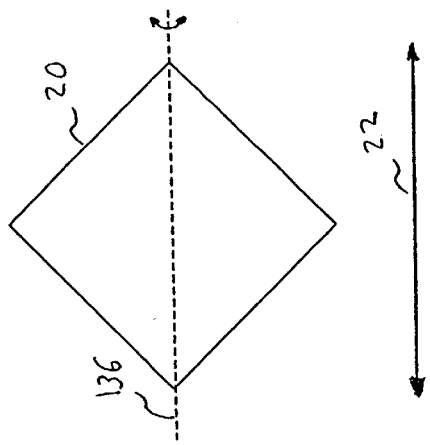
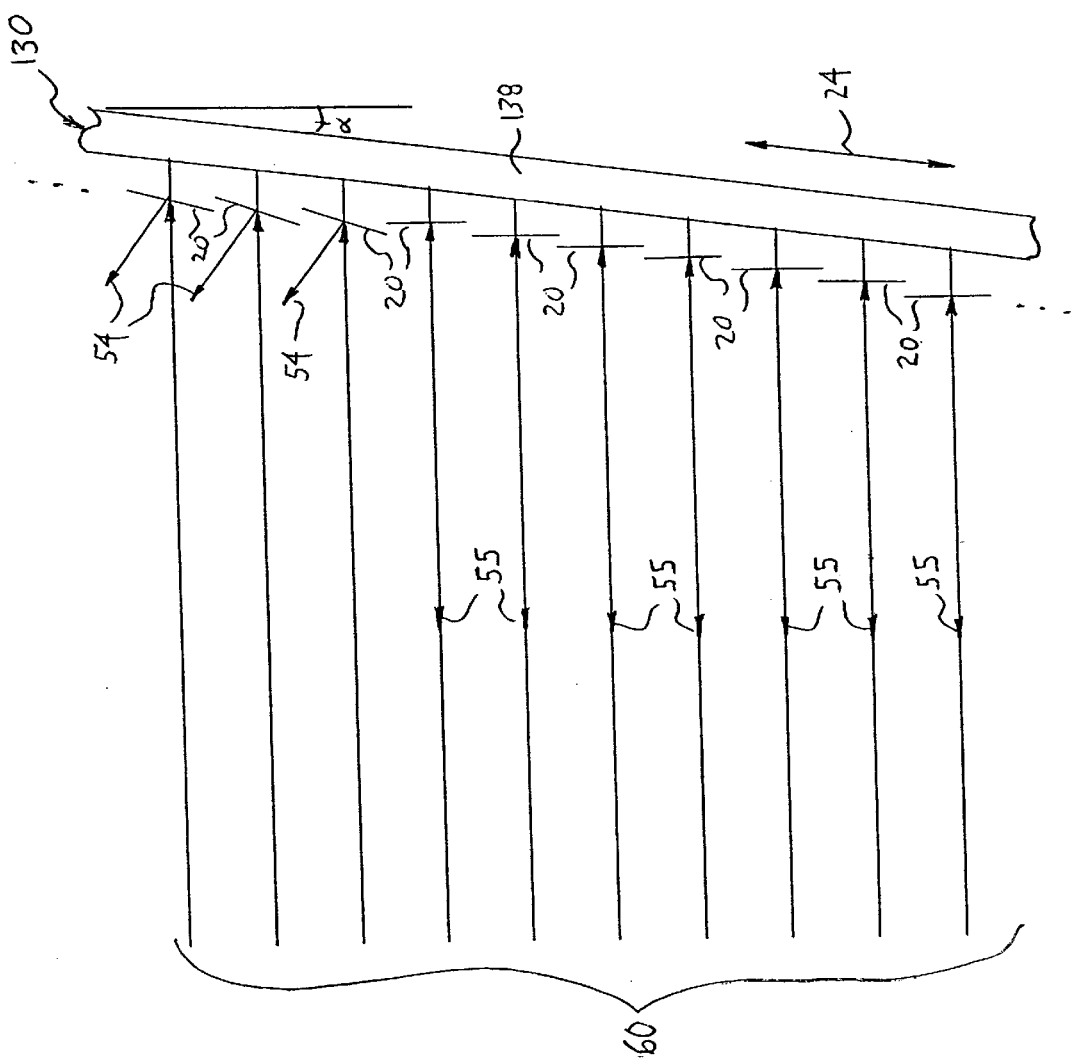

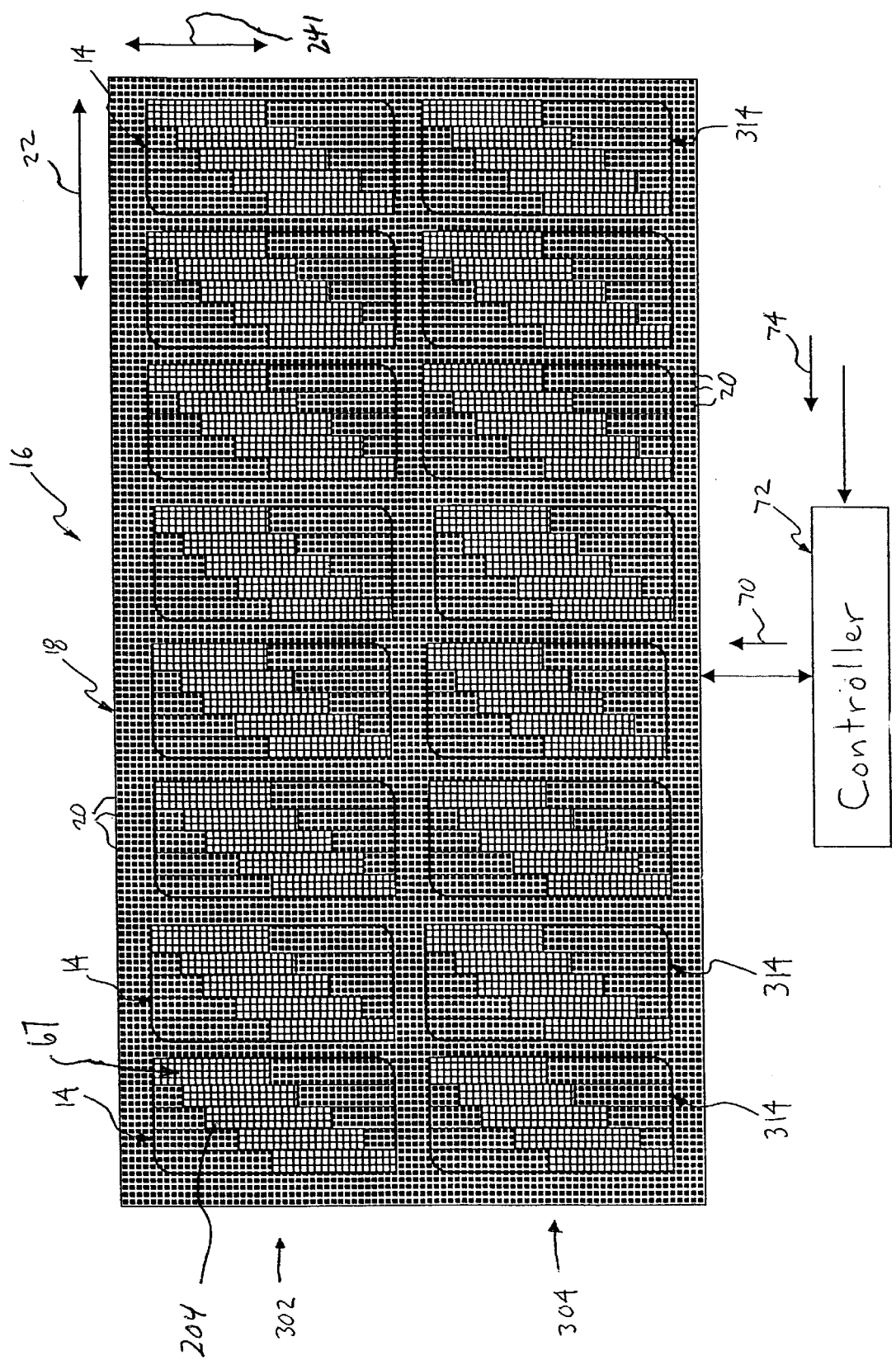

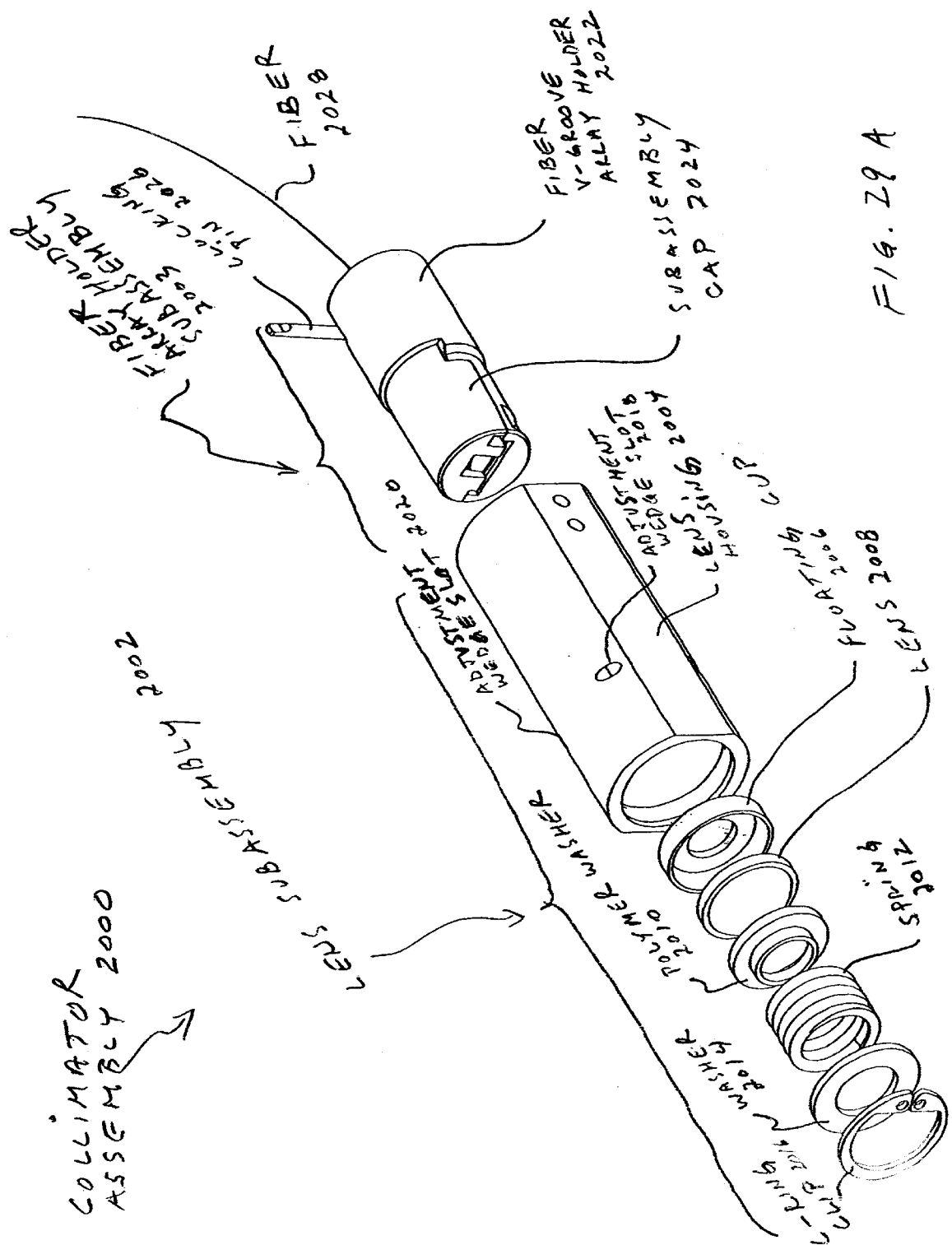

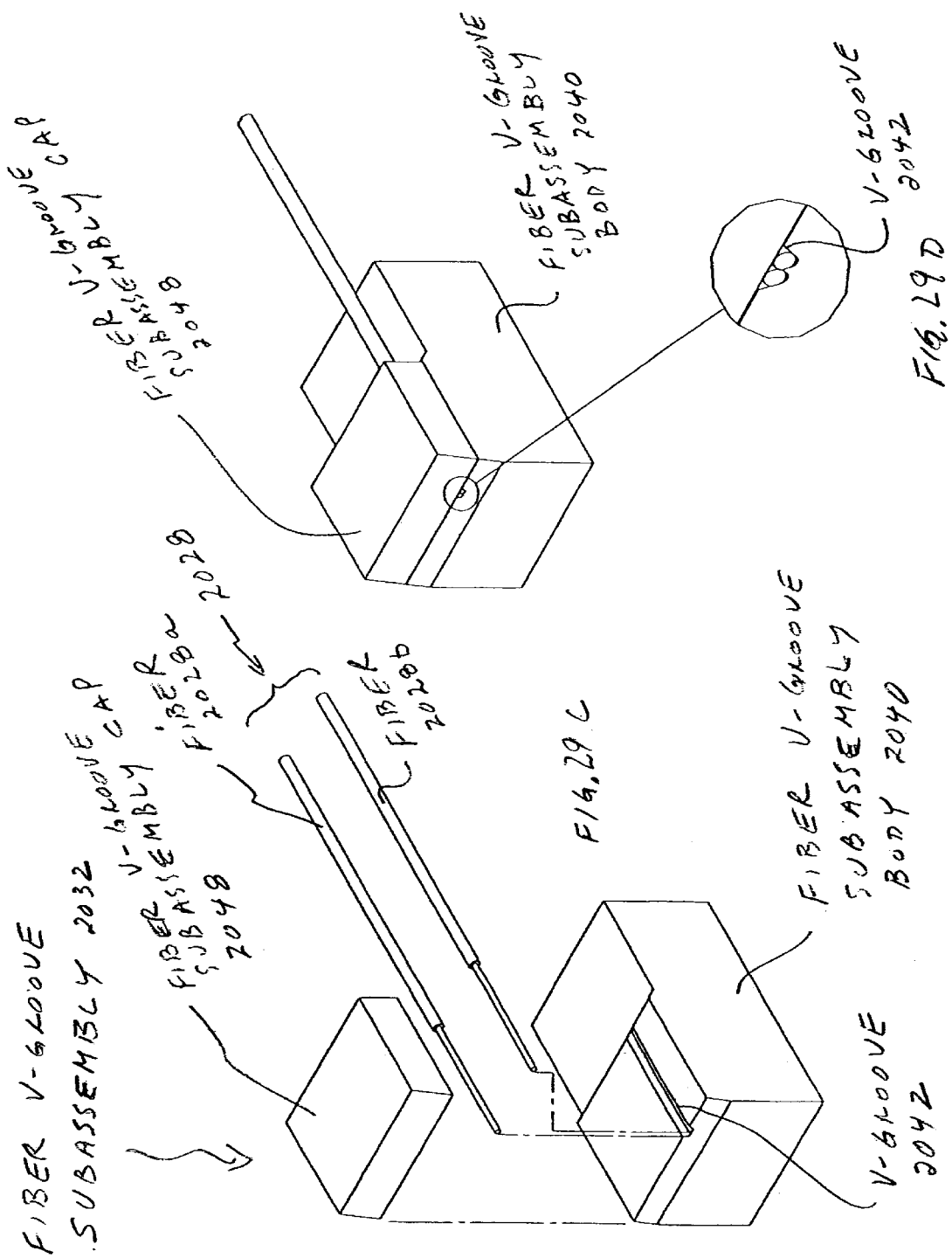

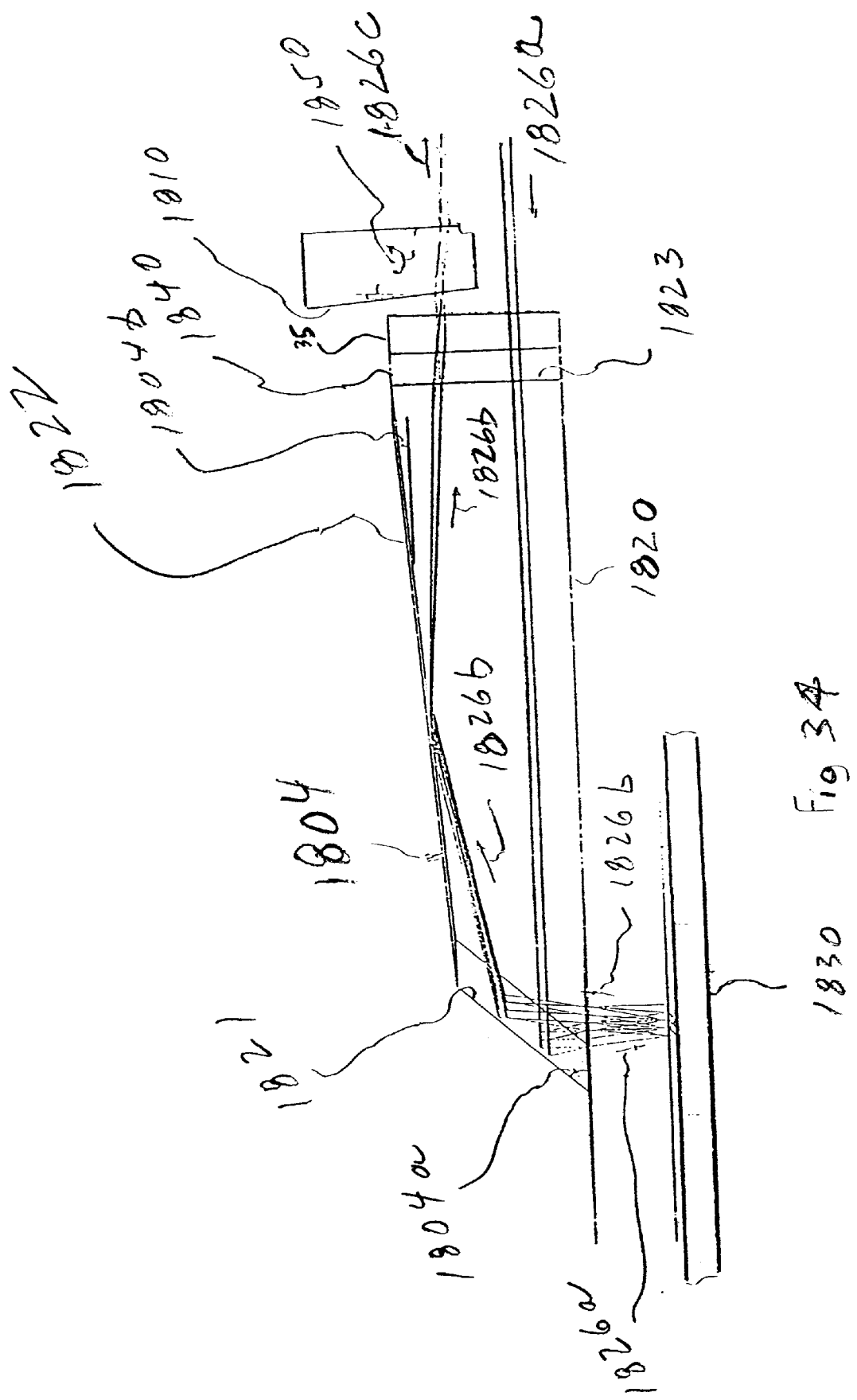

CHROMATIC DISPERSION COMPENSATION DEVICE HAVING AN ARRAY OF MICROMIRRORS

CROSS REFERENCE TO RELATED APPLICATIONS

This patent claims the benefit to U.S. Provisional Patent Application Ser. No. 60/332,318, filed Nov. 16, 2001, and is a continuation-in-part of U.S. patent application Ser. No. 10/115,647, filed Apr. 3, 2002, which claims the benefit of U.S. Provisional Patent Application Ser. No. 60/281,079, filed Apr. 3, 2001; U.S. Provisional Patent Application Ser. No. 60/311,002, filed Aug. 8, 2001; U.S. Provisional Patent Application Ser. No. 60/332,319, filed Nov. 16, 2001; U.S. Provisional Patent Application Ser. No. 60/365,741, filed Mar. 18, 2002; and U.S. Provisional Patent Application Ser. No. 60/365,461, filed Mar. 18, 2002; and is a continuation-in-part of U.S. patent application Ser. No. 10/120,617, filed Apr. 11, 2002, which claims the benefit of U.S. Provisional Patent Application Ser. No. 60/283,197, all of which are incorporated herein by reference in their entirety.

BACKGROUND OF THE INVENTION

1. Technical Field

The present invention relates to a chromatic dispersion compensation device, and more particularly to a chromatic dispersion compensation device including an array of micromirrors to selectively delay portions of an optical channel of a wavelength division multiplexed (WDM) optical signal.

2. Description of Related Art

Fiber optic networks provide high speed, high capacity communication that can exceed 20 gigabytes per second. The transmission data comprises a series of light pulses propagating along an optical fiber. Each light pulse is composed of different spectral components that propagate through the optical fibers at different speeds with higher wavelength components traveling slower than the lower wavelength components of the light pulses in non-dispersion compensated fibers, due to the variation of refractive index of the fiber core. This effect, known as chromatic dispersion, results in the spreading out or broadening of the light pulses.

Chromatic dispersion becomes increasingly pronounced at higher bit rates, such as rates greater than 2.5 gigabytes per second. As the transmission rates increase, the light pulses become closer and closer. At these higher bit rates, the broadening of the light pulses (or bits) may result in the overlapping of adjacent bits, and thus reduces the sensitivity of the receiver to distinguish the bits. Consequently, chromatic dispersion is a limiting factor to the faster transmission of data.

Some known dispersion compensation devices include dispersion compensation fibers (DCF) and chirped grating disposed in an optical fiber.

A dispersion compensation fiber has an index variation with λ being opposite in sign to that of a typical optical fiber transmission fiber within the optical network. For example, the optical fibers of a network typically have a positive index profile. A relatively long compensating fiber having a negative index profile is disposed in-line with the optical fiber. The summation of the two opposite fibers cancels the chromatic dispersion of the network.

A chirped fiber Bragg grating is a special fiber with spatially modulated refractive index that is designed so that longer (shorter) wavelength components are reflected at a farther distance along the chirped fiber Bragg grating than are the shorter (longer) wavelength components. A chirped fiber Bragg grating of this sort is coupled to a fiber communications system through an optical circulator. By causing certain wavelength components to travel longer distances than other wavelength components, a controlled delay is added to those components and opposite dispersion can be added to a pulse. Unfortunately, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system.

A related technology is that of strain-tuned fiber gratings. It is known that the resonant wavelength of an individual fiber grating may be tuned by either tensile strain (i.e., stretching) or compressive strain. Strain tuning has been applied to a uniform grating used for filtering and to a chirped grating used for dispersion compensation.

Present dispersion compensation methods, as described above, have several shortfalls. Dispersion compensators formed by long lengths of compensating fiber normally have a higher loss than conventional fiber. They are also cumbersome and their properties can only be changed in discrete steps since change is accomplished by switching lengths of fiber in and out of the compensator. A chirped fiber Bragg grating has a narrow bandwidth, and even if strain tuned, is only adjustable over a small range. Additionally, a chirped grating typically requires a length on the order of meters for full compensation. What is needed is a way to provide a reliable, fully adjustable (tunable), broadband dispersion compensator with a wide dynamic range. Additionally, such a compensator could be enhanced through the development of a monitoring and control system that monitors dispersion asynchronously and controls dispersion compensating elements using relatively inexpensive hardware.

SUMMARY OF THE INVENTION

An object of the present invention is to provide a chromatic dispersion compensation device having a spatial light modulator that includes a micromirror device having an array of micromirrors, wherein the dispersion compensation device selectively delays a plurality of spectral bands of each respective wavelength band of light (i.e., optical channels) of an optical WDM input signal, which advantageously permits the device to be reconfigurable by changing a switching algorithm that drives the micromirrors, without having to change the hardware configuration.

In accordance with an embodiment of the present invention, a chromatic dispersion compensation device includes a spatial light modulator for reflecting portions of a plurality of respective sections of an optical input channel along a first optical path, and reflecting another portion of each respective section of the optical input channel along a second optical path. The spatial light modulator includes a micromirror device and a controller. The micromirror device includes an array of micromirrors selectively disposable between at least a first and a second position in response to a control signal. The optical input channel is incident on a group of micromirrors. At least a portion of each respective section of the optical input channel reflects along the first optical path when the micromirrors are disposed in the first position or along the second optical path when the micromirrors are disposed in the second position. The micromirror device is tilted at an angle to provide a wavelength dependent time delay of the portion of the optical input channel reflected along the first optical path. The controller generates the control signal in accordance with the switching algorithm.

In accordance with another embodiment of the present invention, the chromatic dispersion compensation device may include a reflective surface disposed substantially parallel to the array of micromirrors to reflect the portion of the optical input signal back to the array of micromirrors. The micromirrors are disposed to reflect each respective portion of the input optical signal of the reflective surface a selected number of time to selectively delay for a time period each respective portion.

BRIEF DESCRIPTION OF THE DRAWING

The drawing, not drawn to scale, includes the following Figures:

FIG. 1 is a block diagram of a chromatic dispersion compensation device including a spatial light modulator in accordance with the present invention;

FIG. 3 shows a pictorial view of a partial row of micromirrors of the array of micromirrors of FIG. 2 in accordance with the present invention;

FIG. 4 is a plan view of a micromirror of FIG. 2 in accordance with the present invention;

FIG. 6 is a block diagram of another embodiment of a chromatic dispersion compensation device including a spatial light modulator, in accordance with the present invention;

FIG. 18 is a plan view of a micromirror of the micromirror device of FIG. 17;

FIG. 19 shows a pictorial view of a partial row of micromirrors of the array of micromirrors of FIG. 17 in accordance with the present invention;

FIG. 28 is a block diagram of a spatial light modulator of the dispersion compensation device of FIG. 13 having an array of micromirrors, wherein the optical channels of a WDM input signal is projected onto the micromirrors, in accordance with the present invention; and FIG. 29A is an exploded view of a collimator assembly according to the present invention;

FIGS. 29C and 29D are exploded views of a fiber V-groove subassembly shown in FIG. 29B;

FIG. 34 is side elevational view of a portion of the optical channel filter of FIG. 33.

BEST MODE FOR CARRYING OUT THE INVENTION

Figure 2:
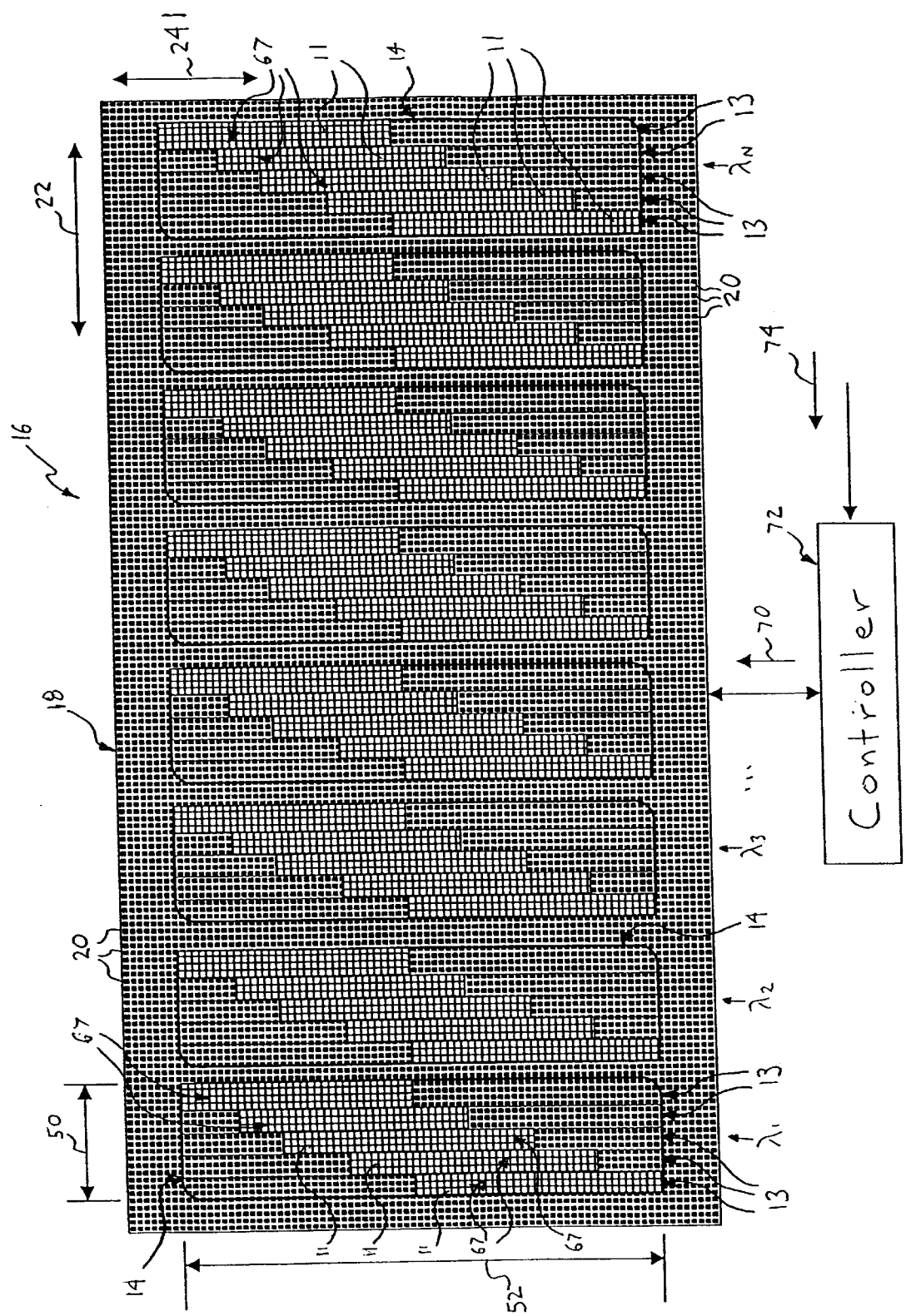
FIG. 2 is a block diagram of a spatial light modulator of the dispersion compensation device of FIG. 1 having an array of micromirrors, wherein the optical channels of a WDM input signal are distinctly projected onto the micromirrors, in accordance with the present invention.

FIGS. 1 and 2 show a chromatic dispersion compensation device, generally indicated as 10, that selectively delays a respective portion 11 (FIG. 2) of a plurality of spectral bands or sections 13 of each respective optical channel 14 (i.e., a wavelength band of light) of an optical WDM input signal 12 to compensate each channel for chromatic dispersion. Each of the optical channels 14 of the input signal 12 is centered at a respective channel wavelength ($\lambda_1$, $\lambda_2$, . . . , $\lambda_N$). As will be described in greater detail hereinafter, the dispersion compensation device 10 includes a spatial light modulator 16 that comprises a micromirror device 18. The micromirror device includes an array of micromirrors 20 that effectively forms a two-dimensional diffraction grating that is mounted in a Littrow (retro-reflecting) configuration.

In FIG. 2, each optical channel 14 is dispersed onto the array of micromirrors 20 along a "spectral" axis or direction 22, and a "spatial" axis or direction 24 to provide a generally rectangular pattern. In an exemplary embodiment of the present invention, each optical channel 14 is divided into five spectral sections 13, wherein the width of each spectral section is three micromirrors. As will be described in greater detail hereinafter, each respective portion 11 of each spectral section 13 is selectively delayed by a desired time period by increasing (or decreasing) the optical path that each portion of the spectral sections propagates in free space. The delay is accomplished by tilting the micromirror device 18 about the spectral axis 24 at an angle α, which adds a time-delay for each portion 11 of each spectral section 13 of each optical channel 14 that reflects off the micromirror device 18 further from the source (not shown).

Figure 9:
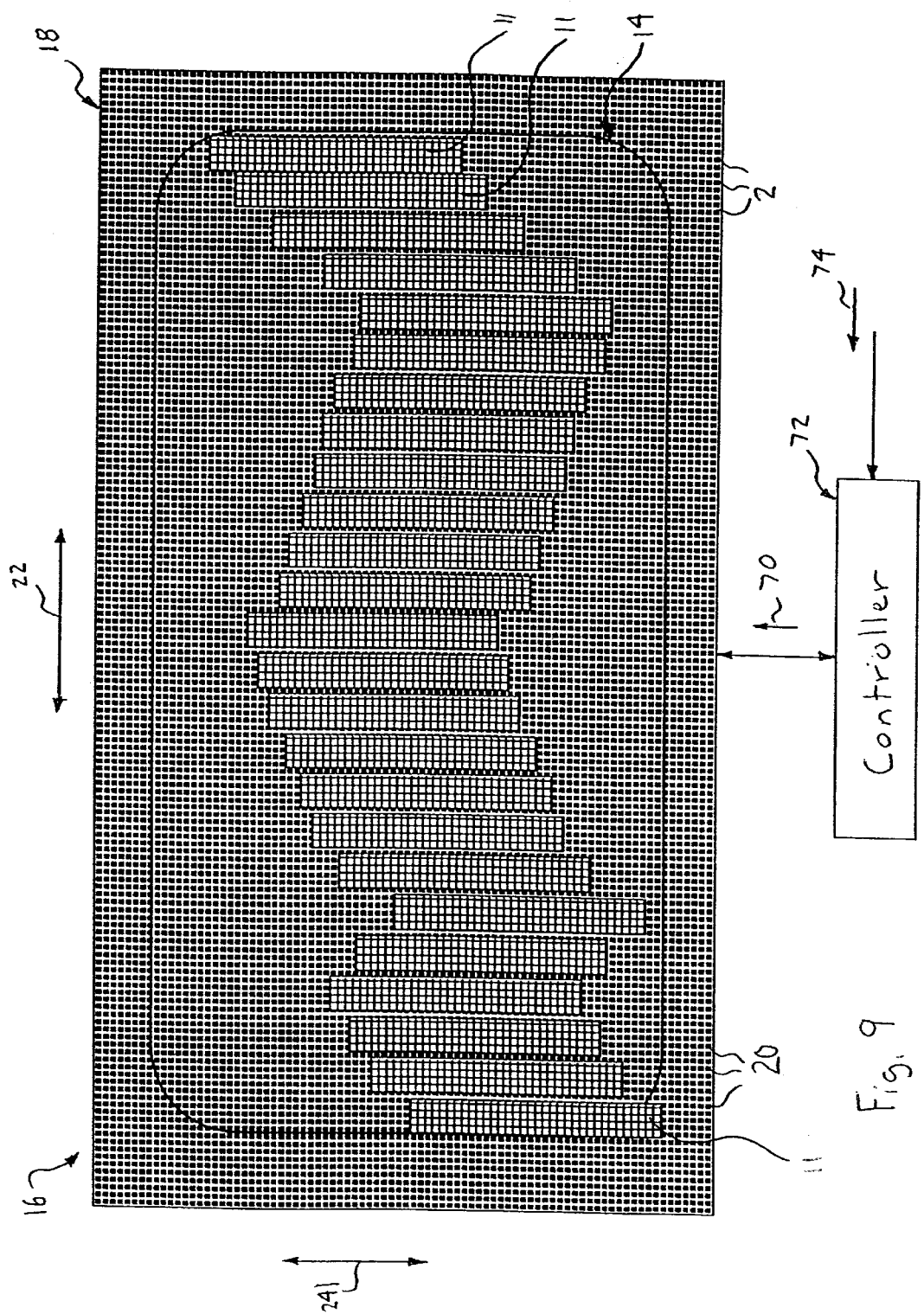
FIG. 9 is a block diagram of a spatial light modulator of the dispersion compensation device of FIG. 7, illustrating various locations of the spectral sections of micromirrors along the spatial axis, in accordance with the present invention.

In FIG. 1, the dispersion compensation device 10 includes a three-port circulator 28 for directing light from a first port 30 to a second port 31 and from the second port to a third port 32. An optical fiber or pigtail 34 is optically connected to the second port of the circulator 28. A capillary tube 36, which may be formed of glass, is attached to one end of the pigtail 34 such as by epoxying or collapsing the tube onto the pigtail. The circulator 28 at the first port 30 receives the WDM input signal 12 from an optical network (not shown) via optical fiber 27, and directs the input light to the pigtail 34. The input signal 12 exits the pigtail 34 (into free space) and passes through a collimator 38, which collimates the input signal. The collimator 38 may be an aspherical lens, an achromatic lens, a doublet, a GRIN lens, a laser diode doublet or similar collimating lens. The collimated input signal 40 passes through a light dispersion element 42, such as a tilted grating or etalon, which spreads each optical channel 14 of the collimated input signal 40 by diffracting or dispersing the light passing through (or reflecting off, as shown in FIG. 9) the light dispersion element. Alternatively, the light dispersion element 42 may include a prism or optical splitter to disperse the collimated input signal as it passes therethrough.

The dispersed light 44 passes through a bulk lens 46 (e.g., a Fourier lens), which focuses the dispersed light onto the spatial light modulator 16. As shown in FIG. 2, the channels 14 dispersed onto the micromirror device 18 of the spatial light modulator 16, having a substantially rectangular optical pattern. One will appreciate though that the optical pattern of each channel 14 may be substantially any shape provided the spectral width 50 and spatial length 52 are sufficient to provide the required compensation (i.e., time-delay and resolution), as will be described in greater detail hereinafter. Regardless of the cross-sectional geometry selected, the cross-sectional area of the channels 14 should illuminate a plurality of micromirrors, which effectively pixelates the optical channels.

In FIG. 1, the spatial light modulator 16 reflects portions 11 of the spectral sections 13 of each optical channel 14 back along the return optical path, as shown by arrows 55, and reflects the remaining portions of the spectral sections 13 of each optical channel away from the bulk lens 46, as shown by arrows 54, to thereby compensate each of the optical channels for chromatic dispersion. The micromirror device 10 is tilted at an angle α (e.g. 10 degrees), to increasingly delay the portions of each spectral section of the optical channels, as each portion 11 moves spatially upward on the array of mirrors 20. For example, the light reflecting off the upper portion of the micromirror device 18 propagates a greater distance than the light reflecting off the lower portion of the micromirror device, and therefore provides a greater time-delay to the light reflecting off the upper portion has a greater time delay.

The compensated channels reflect back through the return optical path 55 to the pigtail 34, and propagate from the second port 31 to the third port 32 of the optical circulator 28 to provide a chromatic dispersion compensated output signal 56 at optical fiber 58.

In FIG. 2, the micromirrors 20 individually flip between a first position and a second position in response to a control signal 70 provided by a controller 72 in accordance with a switching algorithm and an input command 74. The switching algorithm may provide a bit (or pixel) map or lookup table indicative of the state (first position or second position) of each of the micromirrors 20 to provide the desired compensation to each spectral section 13 of each channel 14.

FIG. 3 illustrates a partial row of micromirrors 20 of the micromirror device 18. The micromirrors 20 are square and typically 14–20 μm wide with 1 μm space between them, for example. The micromirrors operate in a "digital" fashion. In other words, the micromirrors are either disposed in the first position, and thus reflect dispersed light 60 back along the return path 55 or can be tilted, flipped or rotated to the second position such that the micromirrors direct light out of or away from the return path at a predetermined angle (e.g., 10 degrees), as indicated by arrows 54. This "digital" mode of operation of the micromirrors advantageously eliminates the need for any type of feedback control for each of the micromirrors. The micromirrors are either "on" or "off" (i.e., first position or second position), respectively, and therefore, can be controlled by simple digital logic circuits. The micromirrors flip about an axis 66 parallel to the spectral axis 22, as shown in FIG. 4. One will appreciate, however, that the micromirrors may flip about any axis, such as parallel to the spatial axis 241.

In FIG. 2, the switching algorithm switches for each optical channel a plurality of arrays of micromirrors (hereinafter referred to as "spectral arrays") that reflect respective portions 11 of each spectral section 13 of each optical channel 14. Each spectral array 67 is defined by a group of micromirrors 20 disposed in the first position such that the light reflecting therefrom reflects back through the return path 55 to the pigtail 34. The remaining portion of the micromirrors 20 are tilted to the second position to reflect that portion of the light of the optical channel 14 away from the return path, as indicated by arrows 54 (see FIGS. 1, 3). The dimensions of the spectral arrays define the resolution of dispersion compensation of each channel and the attenuation of each optical channel. For instance, the spectral width of each spectral array 67 defines the number of spectral sections that may be compensated over the spectrum of each channel 14, and therefore, defines the spectral resolution of the compensation of each optical channel 14. Further, the length of each spectral array defines the attenuation of the optical channel.

In FIG. 2, each optical channel 14 is divided spectrally into five uniform spectral sections 13. Each spectral array 67 reflects a portion of each spectral section of each optical channel back to the pigtail 34 to statically or dynamically compensate for chromatic dispersion for each optical channel. Specifically, each spectral array 67 effectively delays a portion 11 of a respective spectral section 13 of the optical channel a time period dependent upon the location of the spectral array along the spatial axis 241. The closer the spectral array 67 is disposed to the upper portion of the micromirror device 18, the greater the delay of that portion 11 of a respective spectral section 13 of the optical channel 14. Conversely, the closer the spectral array 67 is disposed to the lower portion of the micromirror device 18, the lesser the delay of that portion 11 of a respective spectral section 13 of the optical channel 14.

The range of dispersion compensation capable by the chromatic dispersion compensation device 10 is approximately set by the maximum time delay between different areas of the chromatic dispersion compensation device 10. The maximum time delay is defined by the following equation:

$$D_{max}=2*(L_{spatial})(\sin(\alpha))/V$$

wherein: $D_{max}$=maximum time delay

V=speed of light (0.3 millimeters/picoseconds (mm/ps))

$L_{spatial}$=spatial length of the optical channel

α=tilt angle of micromirror device.

Further, the maximum dispersion compensation is defined by the following equation:

$$DC_{max}=D_{max}*B$$

wherein: $DC_{max}$=maximum dispersion compensation $D_{max}$=maximum time delay B=Optical Channel Bandwidth Assuming the angle α of tilt of the micromirror device 18 is about 10 degrees, and that a single optical channel having a bandwidth of 0.4 nanometers (nm) (i.e., 100 GHz channel) is spread out over 10 mm (i.e., spatial length) along the spatial axis 241 on the micromirror device 18, the maximum time delay is 12 seconds and the maximum dispersion compensation is approximately 29 ps/nm.

The desirable spatial length of the spectral arrays 67 is a trade off between the loss or attenuation of the optical channels 14 and the range of compensation of the device 10. For instance, the greater the spatial length of the spectral arrays 67, the lower the loss or attenuation of the optical channels 14; however, the trade-off is a reduction of the range of chromatic dispersion compensation. Conversely, the lesser the length of the spectral arrays 67, the greater the range of dispersion compensation is, but the trade off is an increase of the loss of the optical channels 14. Therefore, the length of the spectral arrays 67 may be optimized to provide a sufficient range of chromatic dispersion compensation and an acceptable attenuation of the optical signal 14.

Figure 5:
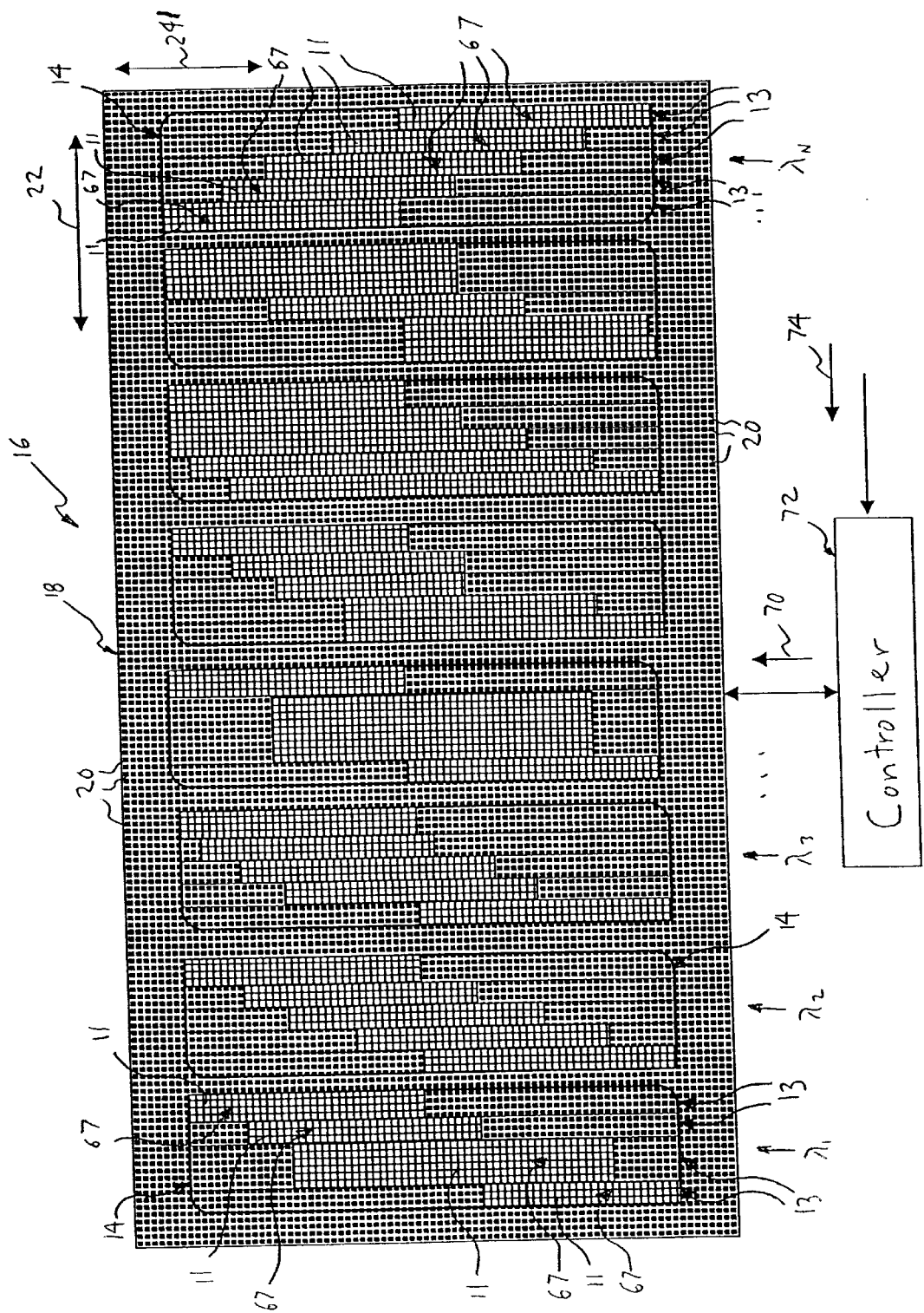
FIG. 5 is a block diagram of a spatial light modulator of the dispersion compensation device of FIG. 2, illustrating varying dimensions and locations of the spectral sections of the micromirrors along the spatial axis, in accordance with the present invention.

In FIG. 2, the spatial length of each spectral array 67 is substantially uniform to thereby provide uniform attenuation over the spectrum of each channel 14. Further, the attenuation of each channel 14 is also substantially uniform over the spectrum of the input signal 12. As shown in FIG. 5, one will recognize that the spatial length of the spectral section may be non-uniform over the spectrum of each channel to vary the optical power loss of each spectral section of each channel. Further, one will appreciate that the attenuation of each channel may be non-uniform or varied. In one embodiment, each channel 14 may be selectively attenuated to flatten or equalize the power of each channel, similar to that described in U.S. Provisional Patent Application Ser. No. 60/311,002, entitled "Dynamic Optical Filter Having an Array of Micromirrors", which is incorporated herein by reference in its entirety.

In addition, the spectral width of each spectral section 13 is substantially uniform and therefore each channel 14 has the same number of spectral sections 67 of equal width. One will appreciate that the channels may be divided into any number of spectral sections and the width of spectral sections 67 may be non-uniform, resulting in varying degrees of resolution of the chromatic dispersion compensation of each optical channel, as illustrated in FIG. 5.

In FIG. 2, the spatial strips 67 of each channel 14 are disposed linearly over the spectrum of each channel to compensate for linear chromatic dispersion, one will recognize that the spatial strips may be disposed nonlinearly over the spectrum to compensate for various nonlinear chromatic dispersion profiles. One will also recognize that the chromatic dispersion compensation profile may vary from channel to channel.

FIG. 6 shows another exemplary embodiment of a chromatic dispersion compensation device 80 that is substantially similar to the chromatic dispersion compensation device 10 of FIG. 1, and therefore, common components have the same reference numeral. The compensation device 80 replaces the circulator 28 of FIG. 1 with a second pigtail 82. The pigtail 82 has a glass capillary tube 84 attached to one end of the pigtail. The pigtail 82 receives the optical channels reflected from the micromirror device back along a return optical path 55. Specifically, pigtail 82 receives the compensation optical channels 14 reflected back along the return optical path 55, which are reflected back from the spatial light modulator 16. The pigtail 34, the light dispersive element 42 and/or the spatial light modulator 16 are tilted or positioned to offset the reflected optical path 55 such that the reflected light is focused onto the second pigtail 82.

An advantage to pixelating the optical channels is that the chromatic dispersion compensation device 10 may be configured for any wavelength plan by simply modifying the software. For example, a chromatic dispersion compensation device for filtering a 50 GHz WDM optical signal may be modified to filter a 100 GHz or 25 GHz WDM optical signal by simply modifying or downloading a different switching algorithm, without modifying the hardware. In other words, any changes, upgrades, calibration or adjustments to the dispersion compensation device (such as varying the spacing of the channels, the shapes of the light beams, and center wavelength of the light beams) may be accomplishment by simply modifying statically or dynamically the switching algorithm (e.g., modifying the bit map). Further, the switching algorithm may be modified to compensate for thermal changes, shock and drift. The pixelation of the optical channels also reduces alignment tolerances in the manufacturing of the compensation device 10 by modifying the switching algorithm.

Figure 7:
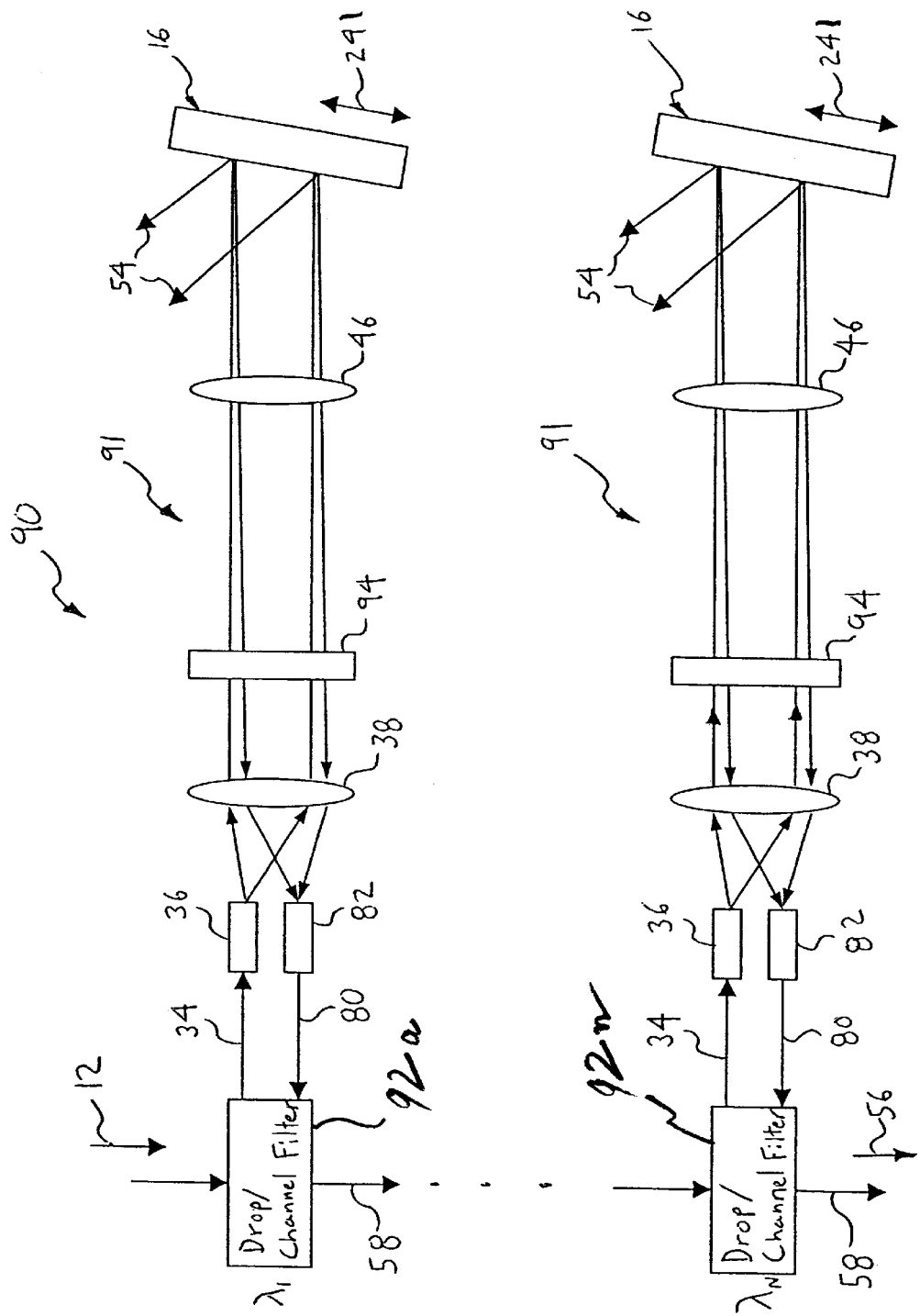
FIG. 7 is a block diagram of another embodiment of a chromatic dispersion compensation device including a spatial light modulator, in accordance with the present invention.

Alternatively, each optical channel 14 may be separately filtered or dropped from the input signal 12 to be separately compensated for chromatic dispersion, and then added back to the input line, as shown in FIG. 7. The chromatic dispersion compensation device 90 includes a plurality of chromatic dispersion compensation devices 91 that include a drop or channel filters 92a, . . . , 92n to select respective optical channels 14 to be compensated. The channel filters 92a, . . . , 92n may also include an optical add/drop multiplexer (OADM). For example, a first channel filter 92a drops an optical input channel 14 signal centered at wavelength $\lambda_1$, and the remaining channels pass through at optical fiber 58. As described hereinbefore for FIG. 6, the optical input channel passes through a light dispersive element 94 (i.e., grating or echelle grating) onto the spatial light modulator 16. The spatial light modulator 16 selectively delays portions of the optical input signal 12 to compensate for chromatic dispersion. The compensated channel is then reflected back to pigtail 80, wherein the compensated channel is added back into input signal 12, to provide a modified signal 56 having at least one compensated optical channel. Each subsequent optical channel 14 is then compensated by a respective chromatic dispersion compensation devices 91.

Figure 8:
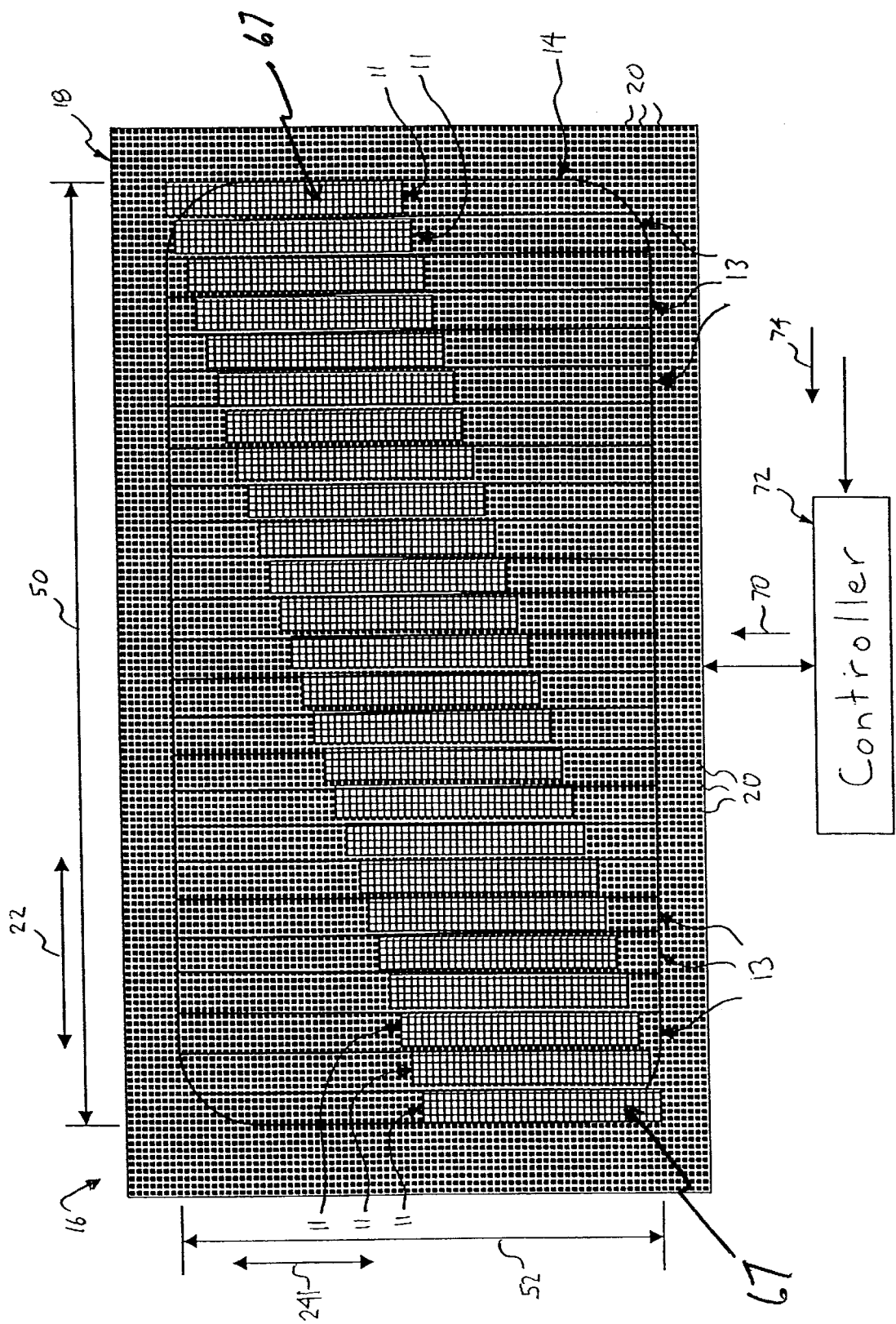
FIG. 8 is a block diagram of a spatial light modulator of the dispersion compensation device of FIG. 7 having an array of micromirrors, wherein an optical channel of a WDM input signal is projected onto the micromirrors, in accordance with the present invention.

The chromatic dispersion compensation device 90 advantageously permits a single optical channel 14 to illuminate a greater area of the micromirror device 18 of the spatial light modulator 16 to thereby increase the resolution of the compensating device 90 by increasing the spectral width of the optical channel over a greater area, as shown in FIG. 8. Spectrally spreading the optical channels on the micromirror devices 18 permits a greater number of spectral sections 13 per optical channel. As shown, the optical channel is divided into 25 spectral sections 13, wherein each respective spectral array 67 is uniform having the same spectral width and spatial length, and positioned on the micromirror device 18 to provide linear chromatic dispersion compensation. In an exemplary embodiment, the optical pattern has a width 50 along the spectral axis 22 of approximately 20 mm and a length 52 along the spatial axis 241 of approximately 10 mm. While each spectral section and spectral array are linearly disposed to provide linear compensation over the spectrum of the optical channel, one will appreciate that spectral arrays may be non-linearly disposed to compensate for nonlinear chromatic dispersion as shown in FIG. 9 for example. Further while the spectral width and spatial length of each spectral array is shown to be uniform in FIG. 8, the spectral width and spatial length of the spectral arrays may be non-uniform as shown in FIG. 5 and described hereinbefore.

Figure 10:
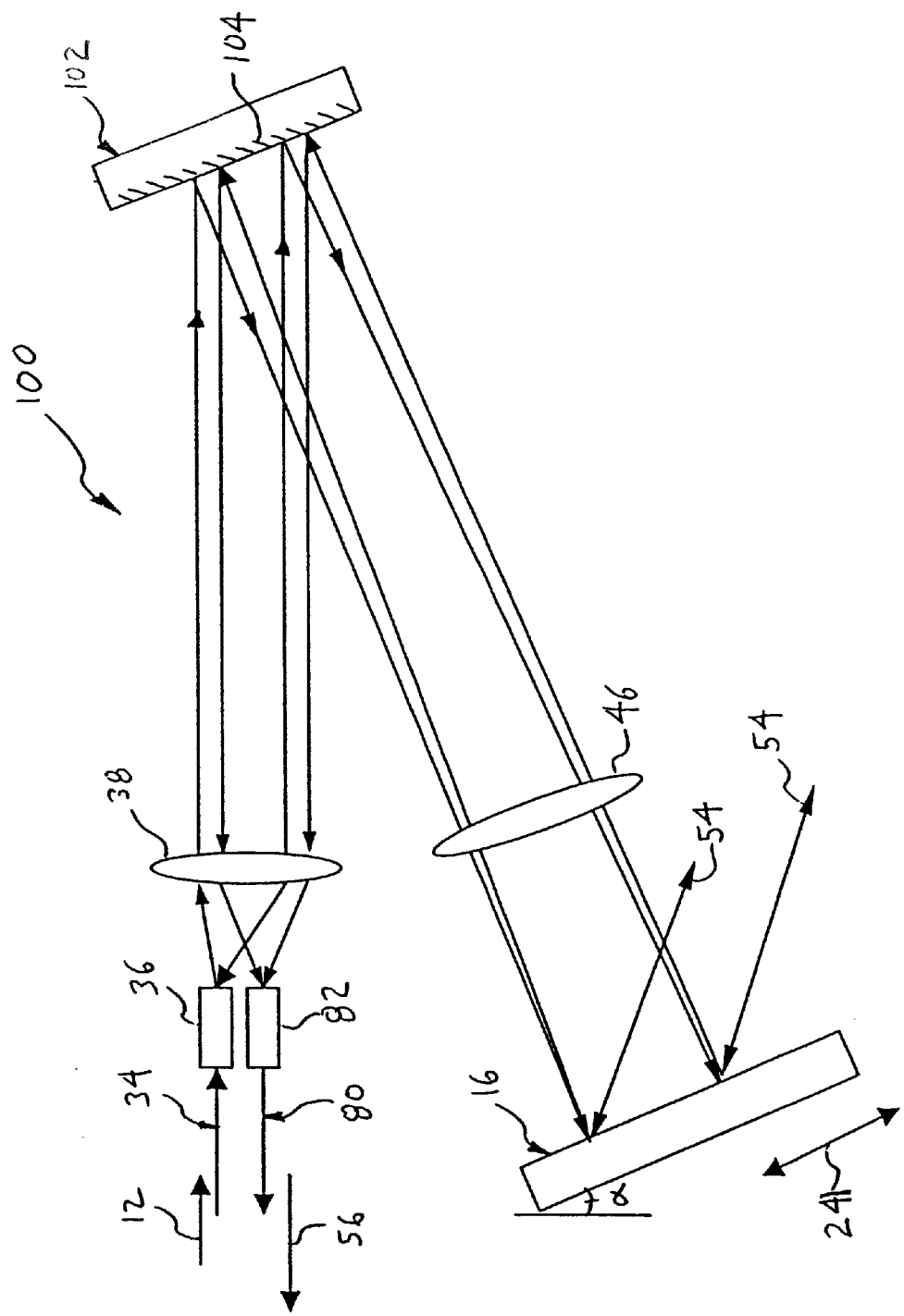
FIG. 10 is a block diagram of another embodiment of a chromatic dispersion compensation device including a spatial light modulator, in accordance with the present invention.

FIG. 10 shows another embodiment of a chromatic dispersion compensation device 100 that is substantially similar to the chromatic dispersion device 80 of FIG. 6, and therefore, common components have the same reference numeral. The chromatic dispersion device 80 substitutes the tilted grating or echelle grating 42 of FIG. 6 with a light dispersion element 102 (e.g., a diffraction grating) that disperses the input light in a reflective mode rather than a transmissive mode. The diffraction grating 102 is formed of a plate of silica or glass having a coating, wherein a plurality of grooves 104 (or lines) are etched, ruled or otherwise formed in the coating. The diffractive grating 102 has a predetermined number of lines, such as 600 lines/mm, 850 lines/mm and 1200 lines/mm. The resolution of the dispersion compensation device 100 improves as the number of lines/mm in the grating increases. The grating 102 may be similar to those manufactured by Thermo RGL, part number 3325FS-660 and by Optometrics, part number 3-9601. Alternatively, the grating may be formed using holographic techniques, as is well known in the art. Further, a prism having a reflective surface or coating on its backside to reflect the dispersed light may also be used.

Figure 11:
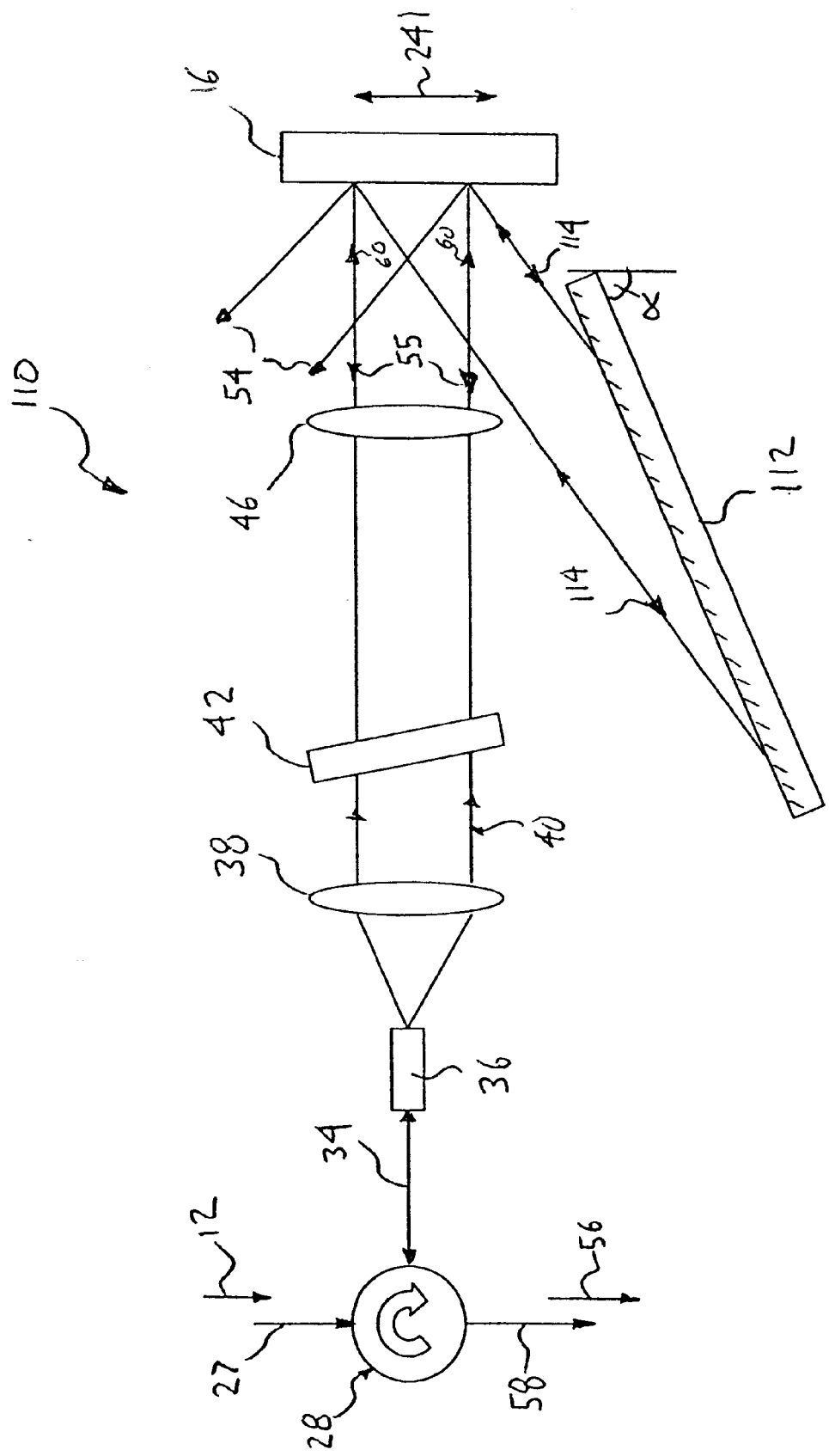
FIG. 11 is a block diagram of another embodiment of a chromatic dispersion compensation device including a tilted grating for increasing the maximum dispersion compensation, in accordance with the present invention.
Figure 12:
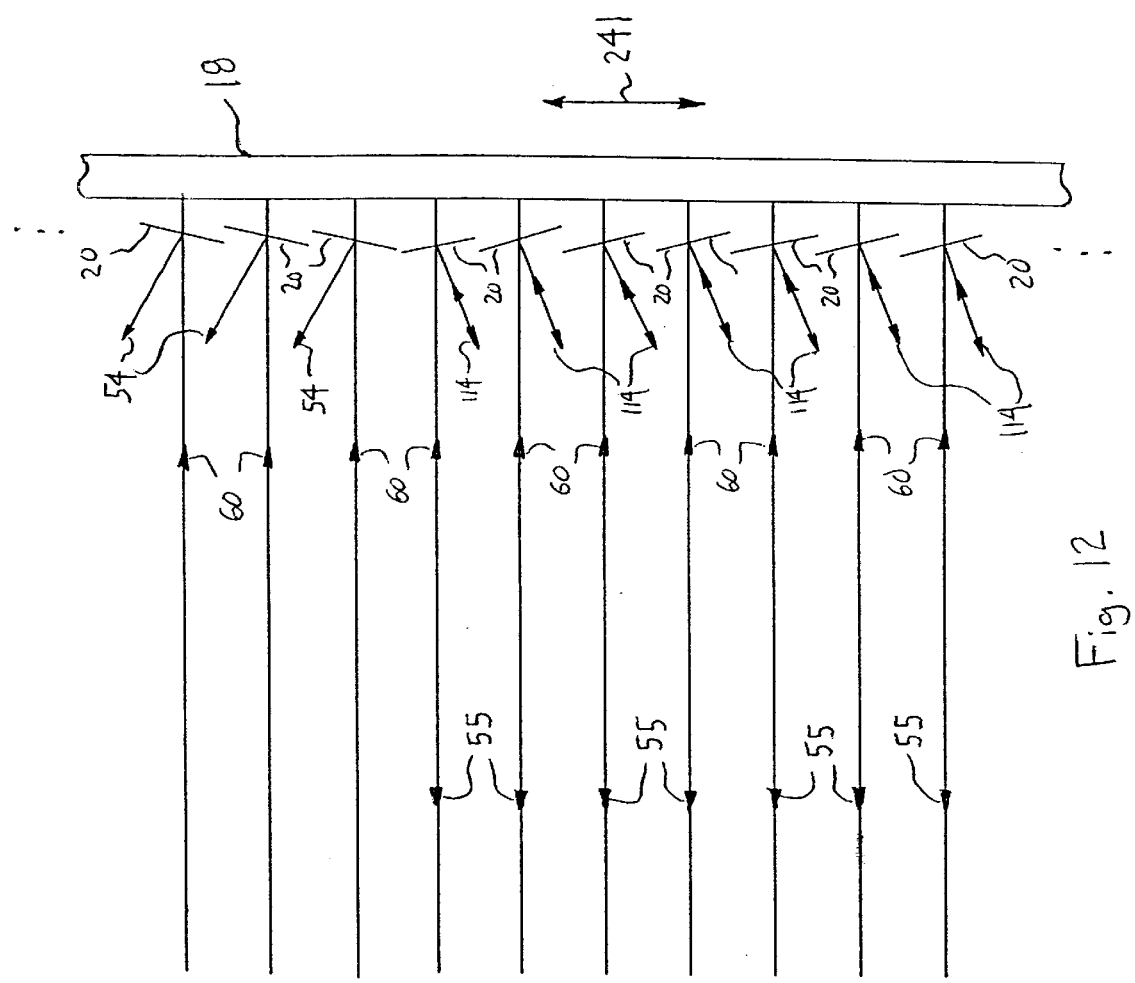
FIG. 12 shows a pictorial view of a partial row of micromirrors of the array of micromirrors of FIG. 11 in accordance with the present invention.

The amount of dispersion compensation of the embodiments of the present invention described hereinbefore is limited to the tilt angle a of the micromirror device 18 (i.e., 10 degrees). FIGS. 11 and 12 illustrate another embodiment of a chromatic dispersion compensation device 110 that increases the maximum dispersion compensation compared to the compensation device 10 shown in FIG. 1, for example. The compensation device 110 of FIG. 11 is substantially similar to the compensation device 10 of FIG. 1, and therefore, common components have the same reference numeral. The compensation device 110 includes a second light dispersive element 112, (i.e., tilted grating or echelle grating) that is used as a retro-reflector having a greater tilt angle $\alpha$ than the micromirror device 18 of the spatial light modulator 16 to increase the time delay as a function of wavelength.

FIG. 12 illustrates a partial row of micromirrors 20 of the micromirror device 18 of the compensating device of FIG. 11. The micromirror device is disposed at an angle to the incident light 60 such that the micromirrors disposed in the first position reflects the input signal to a first path, as indicated by arrows 114, to the echelle grating 112, and the micromirrors 20 disposed in the second position reflects the input signal to a second path, as indicated by arrows 54. The portion 11 of the input signal 12, which is compensated for chromatic dispersion, returns back along the first path, as indicated by arrows 55, to the pigtail 34. One will recognize that the micromirror device 18 may be disposed at any angle relative to the incident input signal 60 provided the micromirrors 20 are not orthogonal to incident light 60 when disposed in either the first or second positions.

Figure 13:
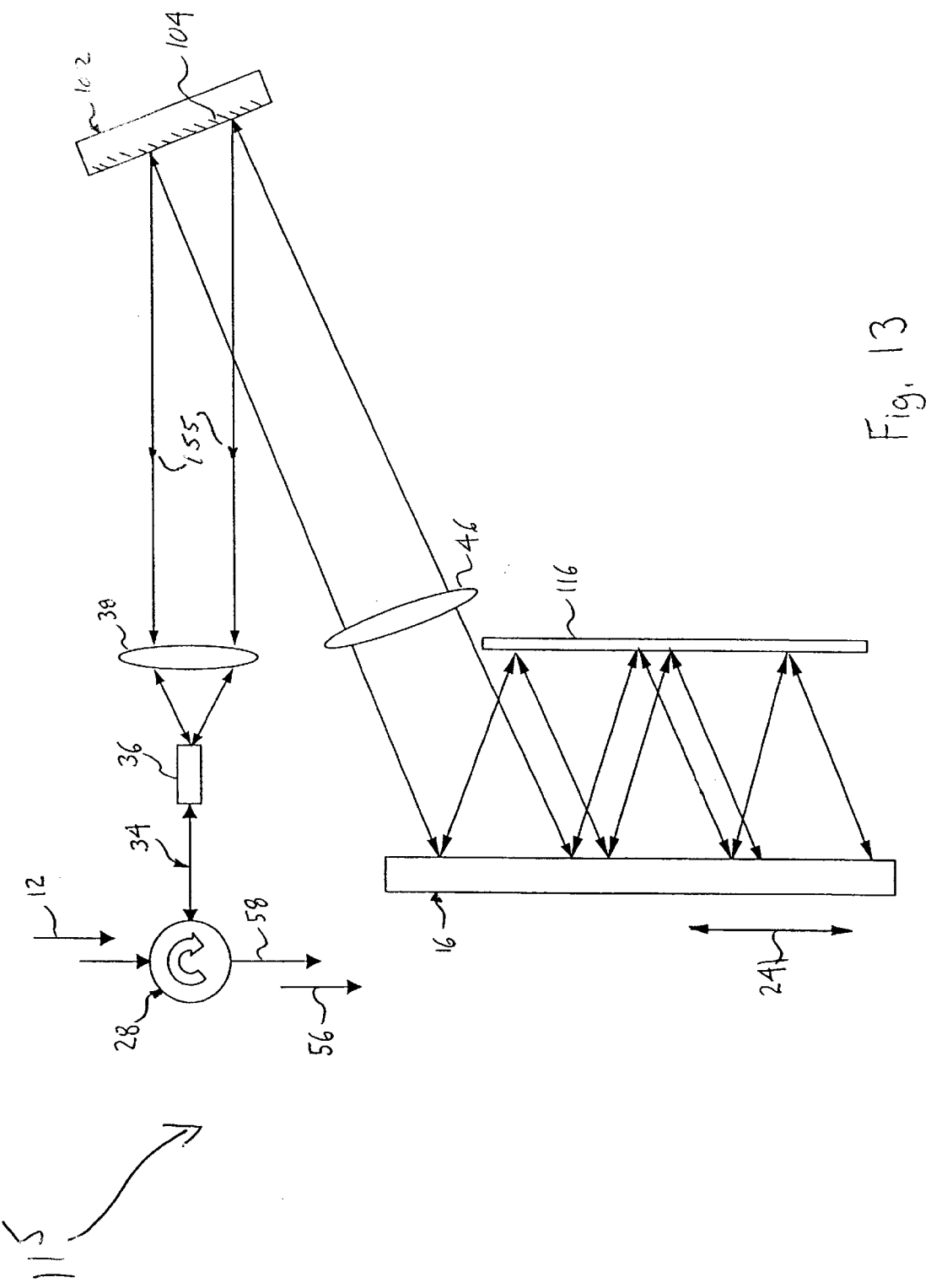
FIG. 13 is a block diagram of another embodiment of a chromatic dispersion compensation device including a spatial light modulator, in accordance with the present invention.
Figure 14:
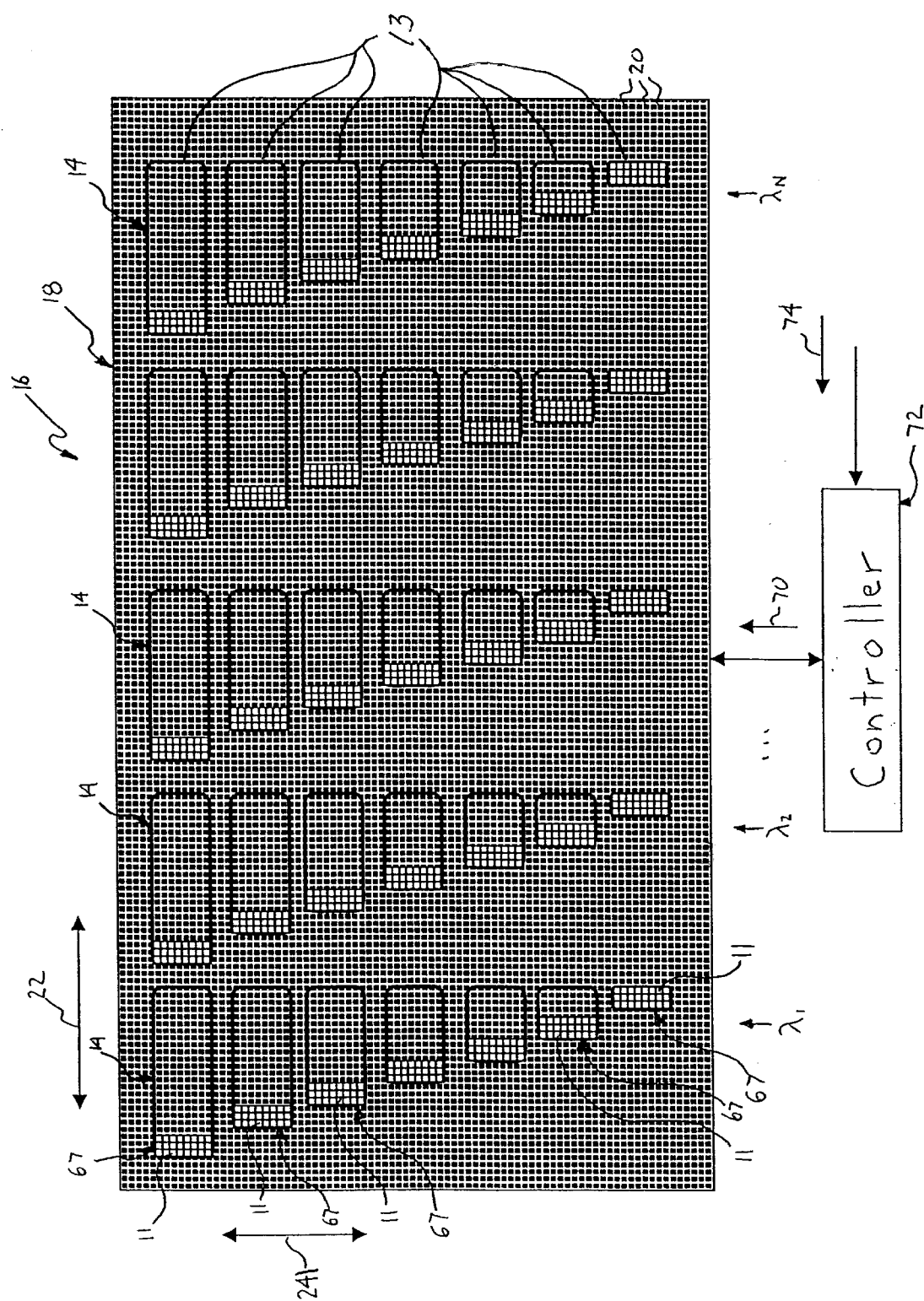
FIG. 14 is a block diagram of a spatial light modulator of the dispersion compensation device of FIG. 13 having an array of micromirrors, wherein the optical channels of a WDM input signal is projected onto the micromirrors, in accordance with the present invention.

FIGS. 13 and 14 show an embodiment of a chromatic dispersion compensation device 115 that does not rely on the tilt of the micromirror device 18 or an echelle grating 112 (see FIG. 11) to provide the time-delay of the respective spectral sections 13. The compensation device 115 is similar to the compensation device of FIG. 11, and therefore similar components have the same reference numeral. The compensation device 115 delays each respective spectral section 13 of an optical channel 14 by reflecting the spectral sections a number of times between the spatial light modulator 16 and a mirror 116 to provide the desire time delay for each spectral section. The mirror 116 is spaced a predetermined distance from and substantially parallel to the micromirror device 18 (see FIG. 14) of the spatial light modulator 16. The micromirrors 20 of the micromirror device 18 are tilted to bounce a spectral section 13 of an optical channel 14 between the micromirror device 18 and the mirror 116 at different areas of the micromirror device 18, and then reflect the spectral section back along the same optical path to the pigtail 34.

In FIGS. 13 and 14, the diffraction grating 102 disperses the optical channels 14 of the input signal 12 onto the upper portion of the micromirror device 18 along the spectral axis 22. The optical channels 14 have a generally rectangular pattern that are spectrally elongated. In an exemplary embodiment, each channel 14 is divided into seven spectral sections 13 along the spatial axis 241. Each spectral section 13 is reflected back along the same optical path 155 to the pigtail 34 by a spectral array 67 of micromirrors having a rectangular pattern with a spatial length of eight micromirrors and a spectral width of 3 micromirrors, as indicated by the white micromirrors. The remaining portion of the optical channel is reflected to the mirror 116, which then reflects the remaining portion to another distinct portion of the micromirror device 18 (FIG. 14) of the spatial light modulator 16 further down on the micromirror device, where another spectral section may be reflected back, for example, to the second pigtail 80 (See FIG. 10). The remaining light continues to reflect between the micromirror device 18 and the mirror 116 spatially downward on the micromirror device until the entire channel is reflected back to the pigtail 34.

Figure 15:
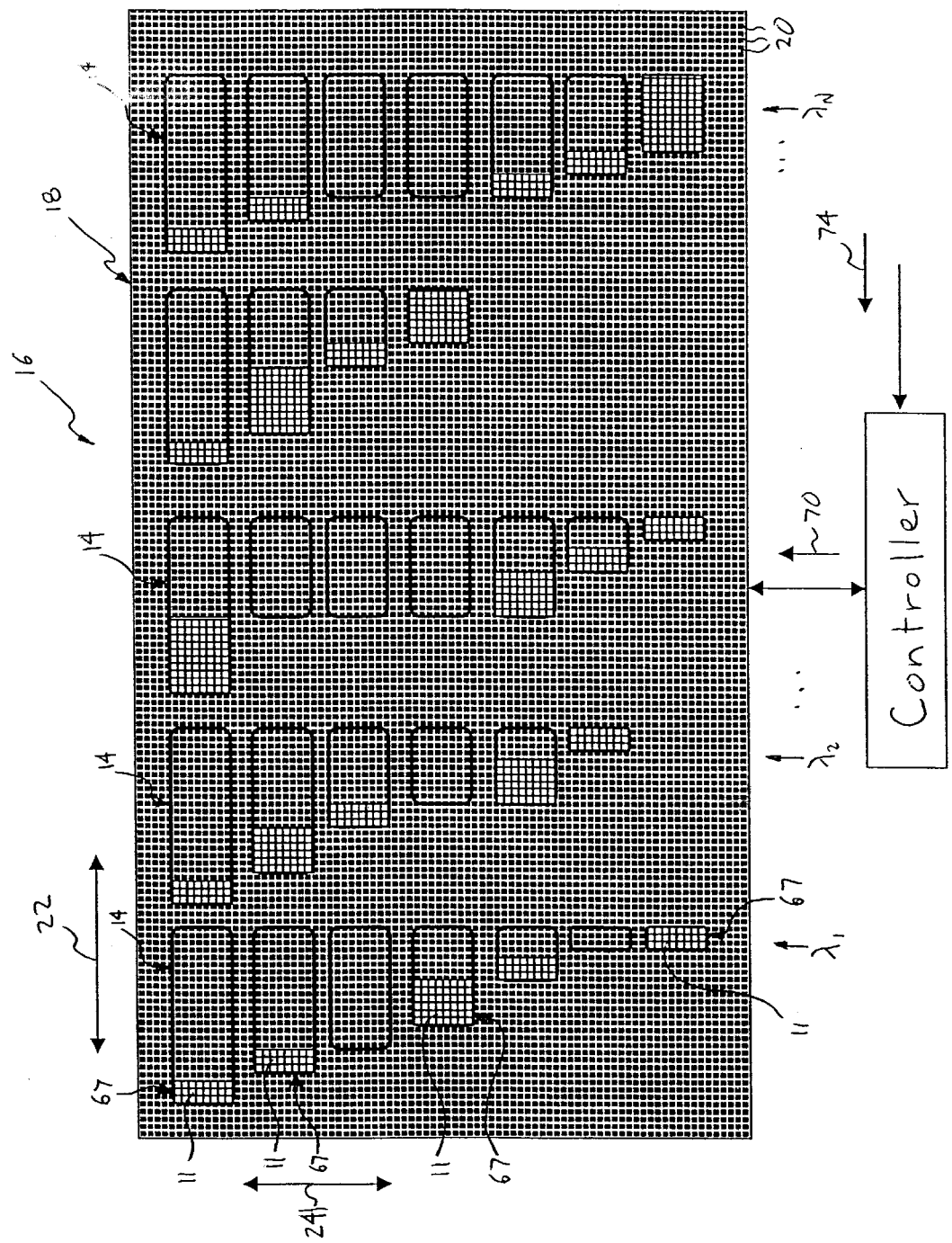
FIG. 15 is a block diagram of a spatial light modulator of the dispersion compensation device of FIG. 13, illustrating varying dimensions and locations of the spectral sections of the micromirrors along the spatial axis, in accordance with the present invention.

While the spectral arrays 67 have substantially the same dimensions and linearly compensate for chromatic dispersion in FIG. 14, one will appreciate that the dimensions of the spectral arrays and the time-delay may be non-linear to compensate for any chromatic dispersion profile, as shown in FIG. 15. An advantage of this embodiment is that spatial length of the spectral array 67 is substantially the same as the spatial length of the optical channel, and therefore substantially all the light of the optical channel is reflected back to the pigtail 34.

Figure 16:
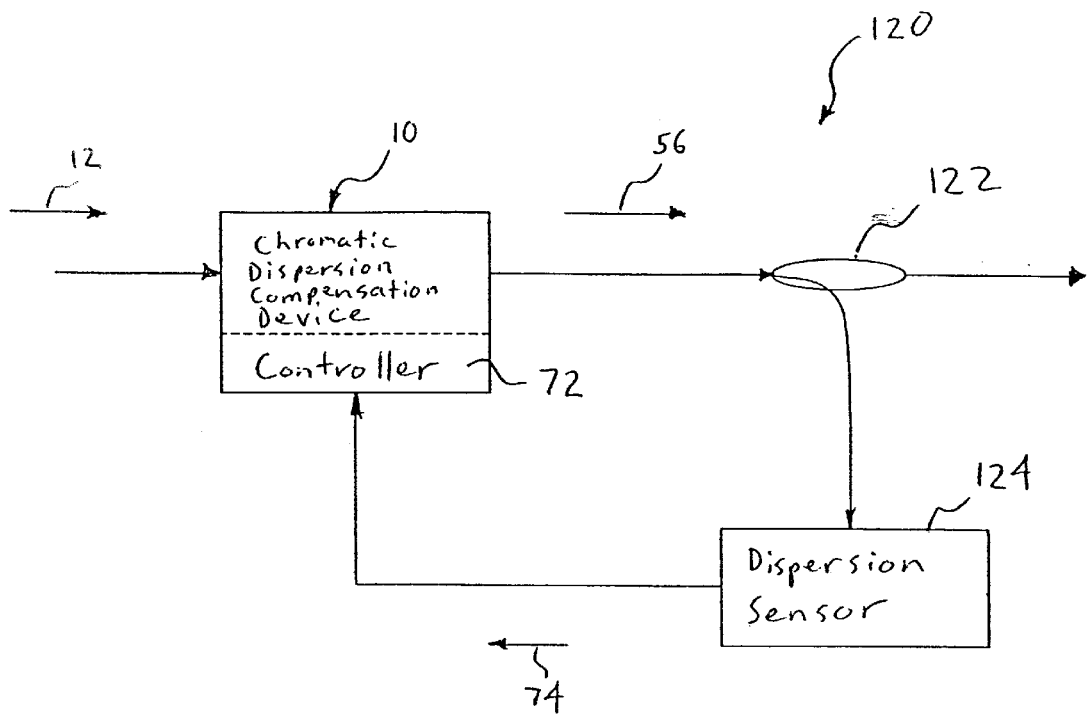
FIG. 16 is a block diagram of a closed-loop chromatic dispersion compensation system in accordance with the present invention.

FIG. 16 shows a closed-loop system 120, wherein an input signal 12 is provided to a chromatic dispersion compensation device embodying the present invention, such as a compensation device 10 of FIG. 1. An optical coupler 122 taps off a portion of the compensated output signal 56 of the compensation device 10 to a dispersion sensor 124, which comprises an eye diagram monitor, and/or a bit error rate monitor, for example. The dispersion sensor 124 generates and provides the feedback signal 74 to the controller 72 of the compensation device 10. In response to the feedback signal 74, the controller 22 generates the control signal 70 (see FIG. 2) to the micromirror device 18 to flip the appropriate micromirrors 20 to compensate for the chromatic dispersion.

One example of a micromirror device 18, similar to that shown in FIGS. 1 and 2, is the Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference.

Figure 17:
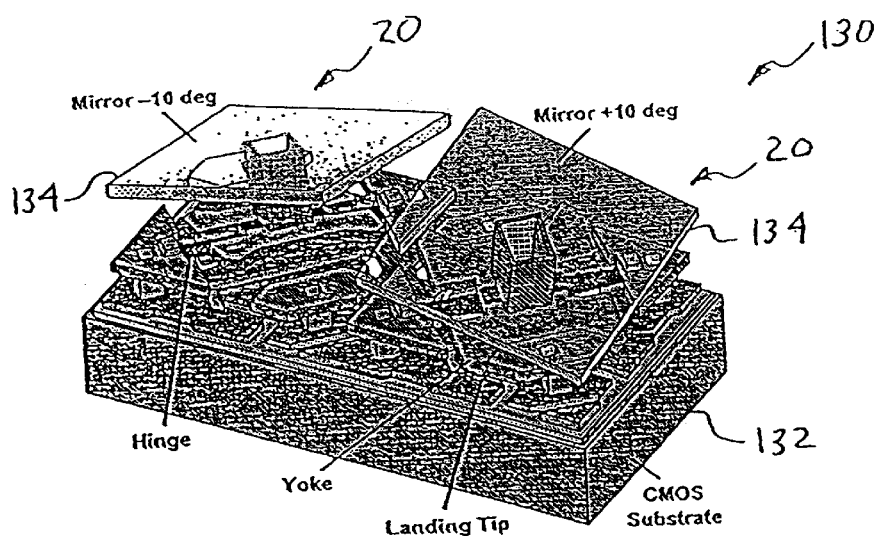
FIG. 17 is a perspective view of a portion of a known micromirror device.

FIG. 17 illustrates a pair of micromirrors 20 of a micromirror device 130 manufactured by Texas Instruments, namely a digital micromirror device (DMD™). The micromirror device 130 is monolithically fabricated by CMOS-like processes over a CMOS memory 132. Each micromirror 20 includes an aluminum mirror 134, 16 μm square, that can reflect light in one of two directions, depending on the state of the underlying memory cell 132. Rotation, flipping or tilting of the mirror 134 is accomplished through electrostatic attraction produced by voltage differences between the mirror and the underlying memory cell. With the memory cell 132 in the on (1) state, the mirror 134 rotates or tilts approximately +10 degrees. With the memory cell in the off (0) state, the mirror tilts approximately −10 degrees. As shown in FIG. 18, the micromirrors 20 flip about an axis 136.

FIG. 19 illustrates the orientation of a micromirror device 130 similar to that shown in FIG. 18, wherein none of the micromirrors 84 are disposed in either the first or second position (i.e., on or off state) are parallel to the base or substrate 138 of the micromirror device 130, as shown in FIG. 3. Consequently as shown in FIG. 19, the base 138 of the micromirror device 130 is mounted at a non-orthogonal angle α relative to the collimated light 60 to position the micromirrors 20, which are disposed at the first position (i.e., perpendicular to the collimated light 44), so that the light reflected off the micromirrors in the first position reflect substantially back through the return path, as indicated by arrows 55, to provide the compensated signal 56 at optical fiber 58. Consequently, the tilt angle of the mirror between the horizontal position and the first position (e.g., 10 degrees) is approximately equal to the angle α of the micromirror device.

Figure 20:
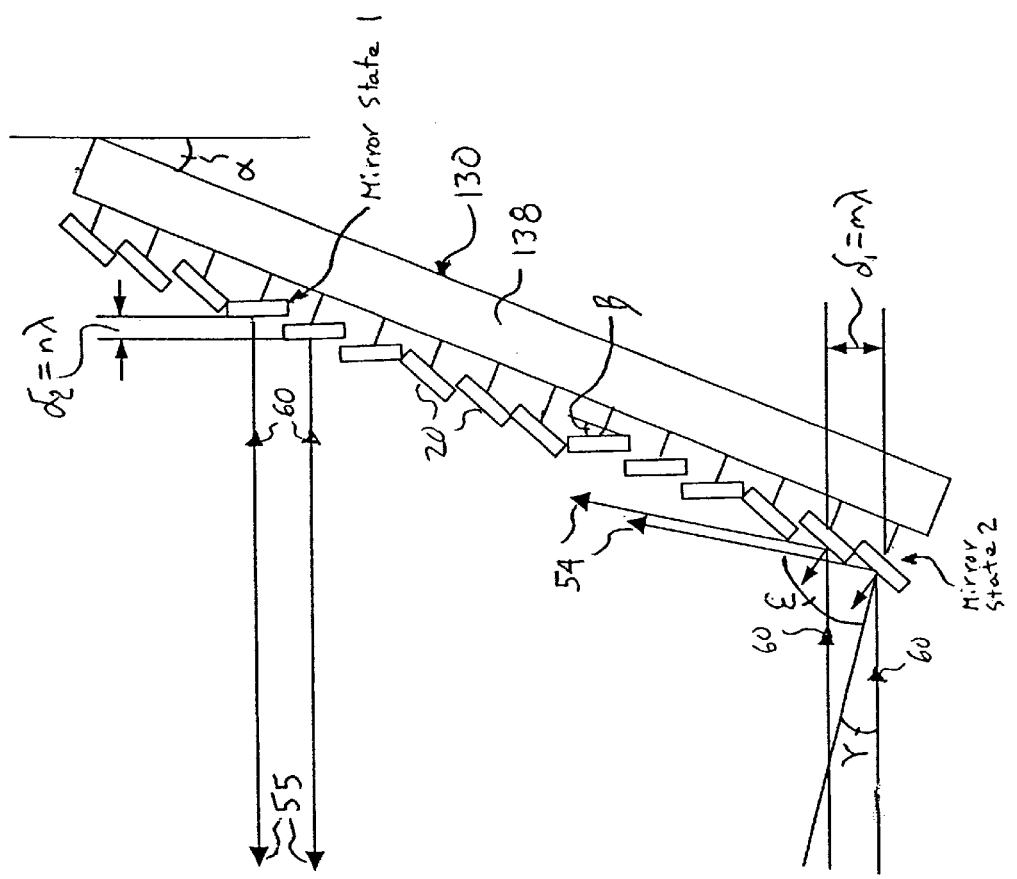
FIG. 20 shows a pictorial view of a partial row of micromirrors of the array of micromirrors of FIG. 17 in accordance with the present invention.

In using the micromirror array device 130, it is important that the reflection from each micromirror 20 adds coherently in the far-field, so the tilt angle α of the micromirror device 130 has a very strong influence on the overall efficiency of the device. FIG. 20 illustrates the phase condition of the micromirrors in both states (i.e., State 1, State 2) for efficient reflection in either condition.

FIG. 20 shows an exemplary embodiment of the micromirror device 130, where the effective pixel pitch ρ is about 19.4 μm (see FIG. 24), so for a mirror tilt angle β of 9.2 degrees, the array is effectively blazed for Littrow operation in the n=+2 order for the position indicated as Mirror State 1 in FIG. 16 (i.e., first position). For Mirror State 2, the incident angle γ on the micromirror device 130 is now 9.2 degrees and the exit angle ε from the array is 27.6 degrees. Using these numbers, the micromirror device is nearly blazed for fourth-order for mirrors in Mirror State 2.

Figure 21:
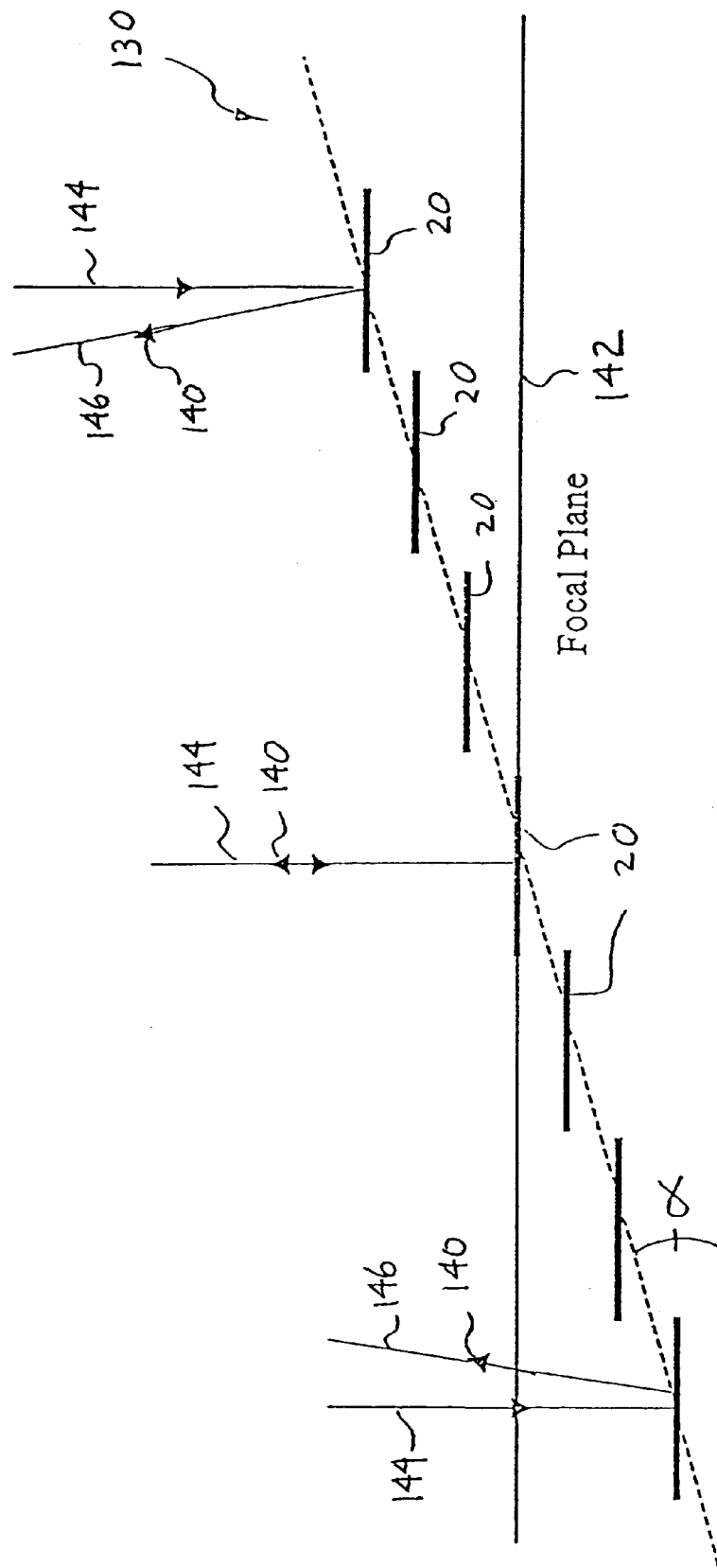
FIG. 21 is a graphical representation of the micromirror device of FIG. 17 showing the reflection of the incident light.
Figure 22:
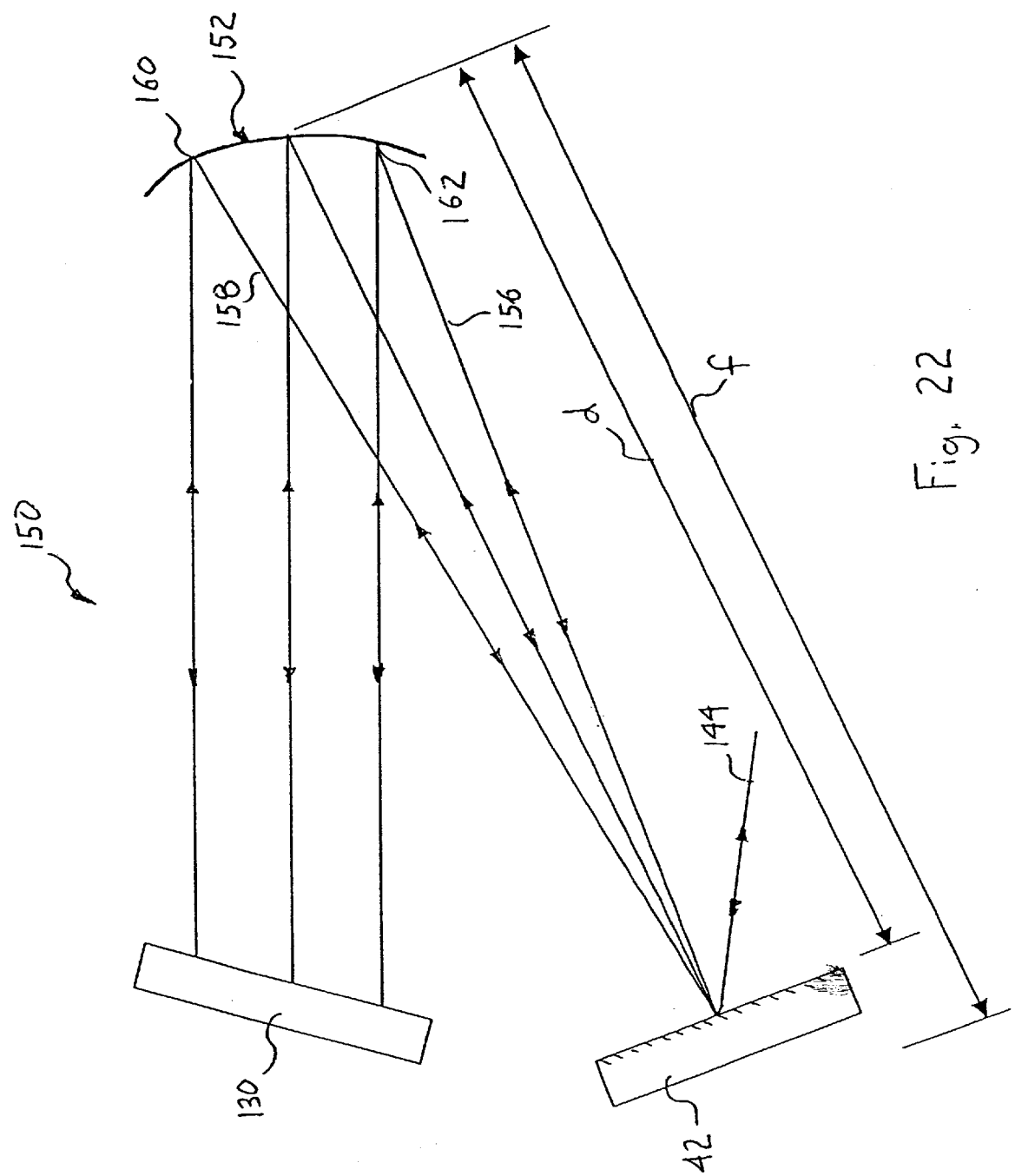
FIG. 22 is a graphical representation of the micromirror device of FIG. 17 and a light dispersion element in accordance with the present invention.

FIG. 21 graphically illustrates the micromirror device 130 wherein the micromirrors 20 are disposed in the retro-reflective operation (i.e., first position), such that the incident light reflects back along the return path, as indicated by arrows 140. For retro-reflective operation, the micromirror device 130 acts as a blazed grating held in a "Littrow" configuration, as shown in FIG. 1, with the blaze angle equal to the mirror tilt "α" (e.g., 10 degrees). The grating equation provides a relationship between the light beam angle of incidence, $\theta_i$; angle of reflection, $\theta_m$; the pitch of the micromirror array; the mirror tilt; and the wavelength of the incident light. Because the wavelength varies across the micromirror array for parallel input beams, the angle of reflection of the beams varies across the apparatus. Introducing the micromirror device 130 at the focal plane 142 implements the critical device feature of providing separately addressable groups of mirrors to reflect different wavelength components of the beam. Because of the above reflection characteristics of the micromirror device 130, the beam is reflected as from a curved concave mirror surface, as shown in FIG. 22 with the micromirror device 130 in the focal plane 142. Consequently, when the micromirror device is oriented to retro-reflect at a wavelength hitting near the mirror center, wavelengths disposed away from the center are reflected toward the beam center as if the beam were reflected from a curved concave mirror. In other words, the micromirror device 130 reflects the incident light 144 reflecting off the central portion of the array of micromirrors directly back along the incident angle of the light, while the incident light 144 reflecting off the micromirrors disposed further away from the central portion of the array progressively direct the light inward at increasing angles of reflection, as indicated by 146.

FIG. 22 illustrates an embodiment of a portion of a chromatic dispersion compensation device 150, which incorporates a curved reflector lens 152 having a focal length of "f", which represents the Fourier lens 46. The curved reflector lens 152 is positioned a distance "d" from the diffraction grating 42 where d<f to correct for the effective curvature of the micromirror device 130. As will be appreciated the longer wavelengths indicated as 156 travel a shorter distance than the short wavelengths indicated as 158 and reflect off reflector lens 152 at different points 160, 162 respectively such that the incident light beam 144 is retro-reflected without introducing any wavefront distortion at the micromirror device.

Figure 23:
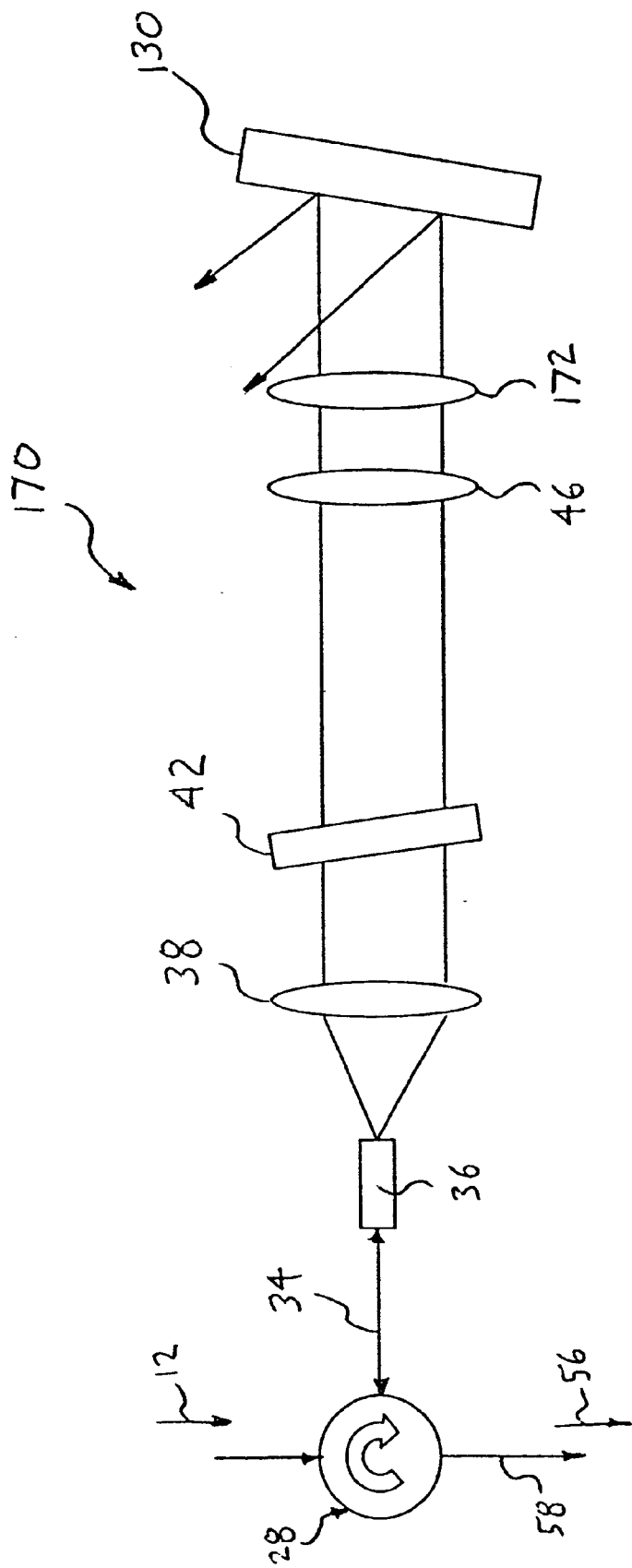
FIG. 23 is a block diagram of another embodiment of a chromatic dispersion compensation device including a spatial light modulator in accordance with the present invention.

Alternatively, the effective curvature of the micromirror device 130 may be compensated for using a "field correction" lens 172. In an exemplary embodiment shown in FIG. 23, the chromatic dispersion compensation device 170 is similar to the compensation device 10 of FIG. 1, and therefore similar components have the same reference numeral. The compensation device 170 includes a field correction lens 172 disposed optically between the bulk lens 46 and the spatial light modulator 174, which includes micromirror device 130. The "field correction" lens 172 respectively compensate for the channels reflecting off the spatial light modulator 174.

Figure 24:
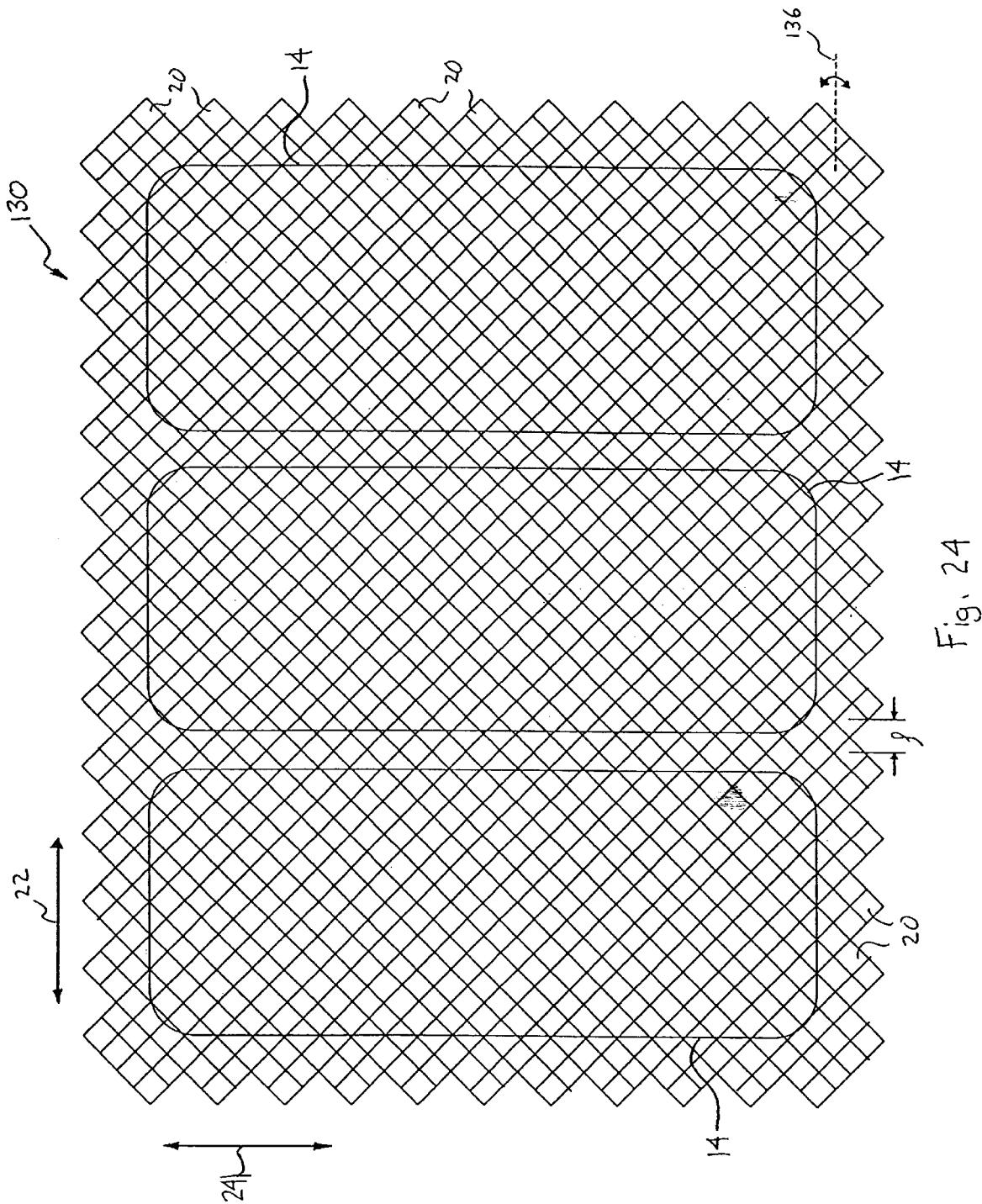
FIG. 24 is an expanded view of the micromirror device of the spatial light modulator of FIG. 19, wherein the optical channels of a WDM input signal are distinctly projected onto the micromirrors, in accordance with the present invention.

As described hereinbefore, the micromirrors 20 of the micromirror device 130 flip about a diagonal axis 136 as shown in FIGS. 18 and 24. In an exemplary embodiment of the present invention shown in FIG. 24, the optical input channels 14 are focused on the micromirror device 130 such that the spectral axis 22 of the optical channel is parallel to the tilt axis 136 of the micromirrors. This configuration is achieved by rotating the micromirror device 45 degrees compared to the configuration shown in FIG. 2. Focusing the optical channels in this orientation maximizes the ability to control the attenuation step and chromatic dispersion. Alternatively, the optical channels 14 may be focused such that the spectral axis 22 of the optical channel 14 is perpendicular to the tilt axis 136 of the micromirrors. Further, one will appreciate that the orientation of the tilt axis 136 and the spectral axis 24 may be at any angle.

Figure 25:
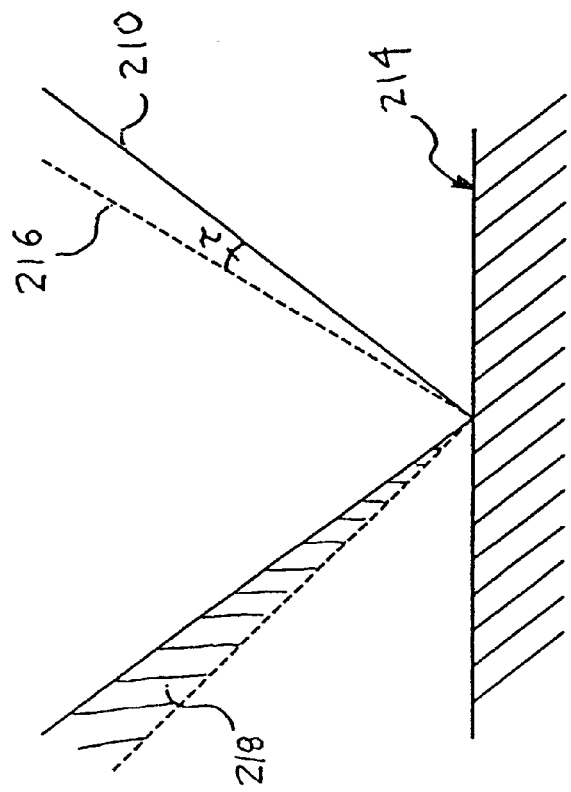
FIG. 25 is a graphical representation of the light of an optical channel reflecting off a spatial light modulator, wherein the light is focused relatively tight, in accordance with the present invention.
Figure 26:
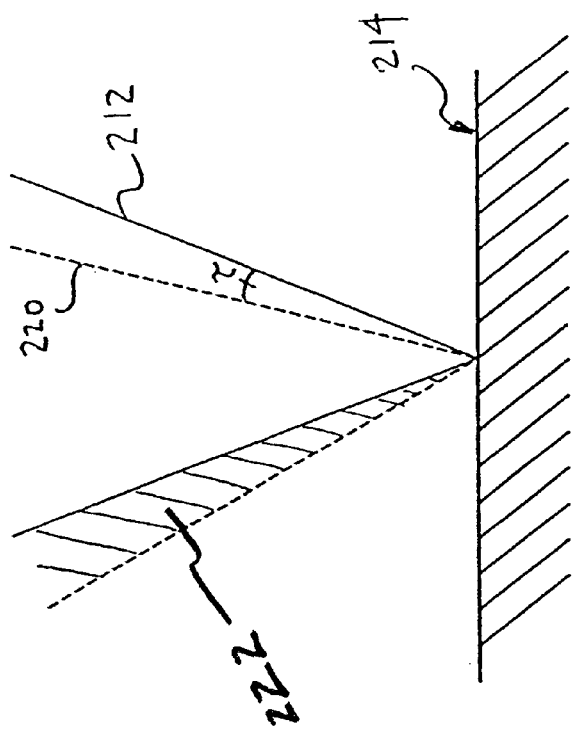
FIG. 26 is a graphical representation of the light of an optical channel reflecting off a spatial light modulator, wherein the light is focused relatively loose compared to that shown in FIG. 25, in accordance with the present invention.

In the operation of the micromirror device 130 manufactured by Texas Instruments, described hereinbefore, all the micromirrors 20 of the micromirror device 130 release when any of the micromirrors are flipped from one position to the other. In other words, each of the mirrors will momentarily tilt towards the horizontal position upon a position change of any of the micromirrors. Consequently, this momentary tilt of the micromirrors 20 creates a ringing or flicker in the light reflecting off the micromirrors. To reduce or eliminate the effect of the ringing of the light during the transition of the micromirrors 20, the light is focused tightly on the micromirror device 130. FIGS. 25 and 26 illustrate the effect of the ringing of micromirrors during their transition. Both FIGS. 25 and 26 show an incident light beam 210, 212, respectively, reflecting off a mirror surface at different focal lengths. The light beam 210 of FIG. 25 has a relatively short focal length, and therefore has a relatively wide beam width. When the micromirror surface 214 momentarily tilts or rings a predetermined angle τ, the reflected beam 216, shown in dashed lines, reflects off the mirror surface at the angle τ. The shaded portion 218 is illustrative of the lost light due to the momentary ringing, which represents a relatively small portion of the incident light 210. In contrast, the light beam 212 of FIG. 26 has a relatively long focal length, and therefore has a relatively narrow beam width. When the micromirror surface 214 momentarily tilts or rings a predetermined angle τ, the reflected beam 220, shown in dashed lines, reflects off the mirror surface at the angle τ. The shaded portion 222 is illustrative of the lost light due to the momentary ringing, which represents a greater portion of the incident light 212, than the lost light of the incident light of FIG. 25. Consequently, the sensitivity of the momentary tilt of the micromirrors 20 is minimized by tightly focusing the optical channels on the micromirror device 130. Advantageously, tightly focusing of the optical channels also reduces the tilt sensitivity of the micromirror device due to other factors, such as thermal changes, shock and vibration.

While the embodiments of the present invention described hereinabove illustrate a single chromatic dispersion compensation device using a set of optical components, it would be advantageous to provide an embodiment including a plurality of dispersion compensation devices that uses a substantial number of common optical components, including the spatial light modulator.

Figure 27:
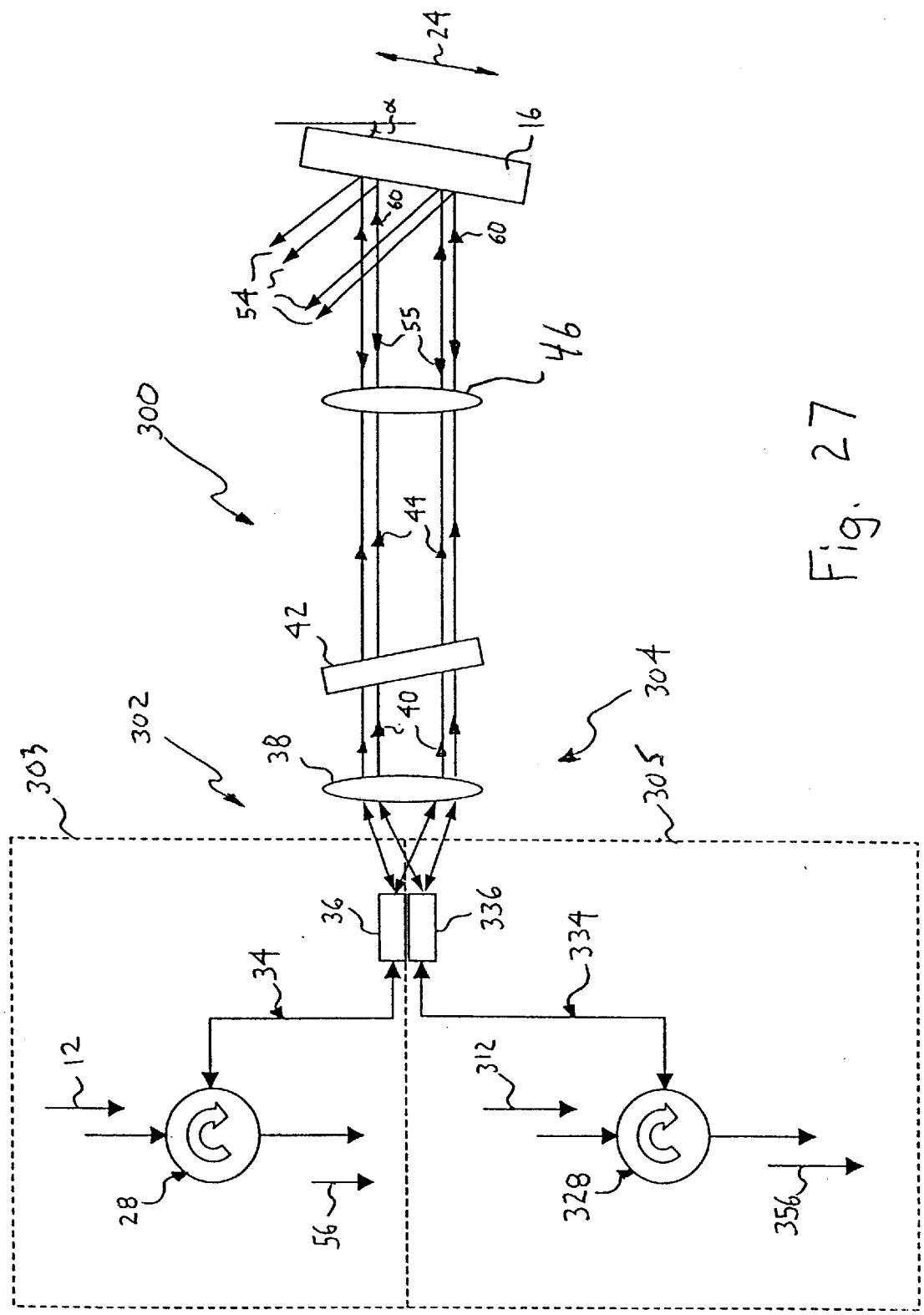
FIG. 27 is a block diagram of another embodiment of a chromatic dispersion compensation device including a spatial light modulator, in accordance with the present invention.

FIG. 27 illustrates such an embodiment of a chromatic dispersion compensation device 300, which is substantially the same as the dispersion compensation device 10 in FIG. 1. Common components between the embodiments have the same reference numerals. The dispersion compensation device 300 provides a pair of dispersion compensation devices 302, 304, each of which use substantially all the same optical components, namely the collimating lens 38, the diffraction grating 42, the bulk lens 46 and the spatial light modulator 16. The first compensation device 302 is substantially the same as the compensation device 10 of FIG. 1. The second compensation device 304 is provided by adding a complementary set of input optical components 305. The input optical components 303 of the first compensation device 302 and the input optical components 305 of the second compensation device 304 are the same, and therefore common components have the same last two numerals.

To provide a plurality of chromatic dispersion compensation devices 302, 304 using similar components, each compensation device uses a different portion of the micromirror device 16, as shown in FIG. 28, which is accomplished by displacing spatially the ends 36, 336 of the pigtails 34, 334 of the compensation devices 302, 304. As shown, the optical channels 14, 314 of each compensation device 302, 304 are displaced a predetermined distance in the spatial axis 241. Similar to that described hereinabove, the spectral arrays 67 of white micromirrors 204 reflect back along the return path 55 a portion of each optical channel to compensate for chromatic dispersion. While the exemplary embodiment shown in FIGS. 27 and 28 illustrate a pair of compensation devices 302, 304, one will recognize that any number of compensation devices may use a common spatial light modulator. Further, one will recognize that while a number of components 38, 42, 46 are common to each of the compensation devices 302, 304 of FIG. 27, two sets of independent optics may be used to direct the light to a common spatial light modulator 16.

FIG. 29A shows a collimator assembly generally indicated as 2000. The collimator assembly 2000 may be used in place of the arrangement of either the capillary tube 36 and the collimator lens 38 in any one or more of the embodiments described above.

The collimator assembly has a lens subassembly 2002 and a fiber array holder subassembly 2003. The lens subassembly 2002 includes a lens housing 2004 for containing a floating lens cup 2006, a lens 2008, a polymer washer 2010, a spring 2012, a washer 2014 and a C-ring clip 2016. The lens housing 2004 also has two adjustment wedge slots 2018, 2020. The fiber array holder subassembly 2003 includes a fiber V-groove array holder 2022, a subassembly cap 2024 and a clocking pin 2026. The fiber 2028 is arranged in the fiber array holder subassembly 2003. The V-groove array holder 2022 is designed to place the one or more fibers 2028 on the nominal origin of an optical/mechanical access. The clocking pin 2026 sets the angle of a semi-kinematic mount, and therefore the angle of the one or more fibers 2028 relative to the nominal optical and/or mechanical access.

Figure 29B:
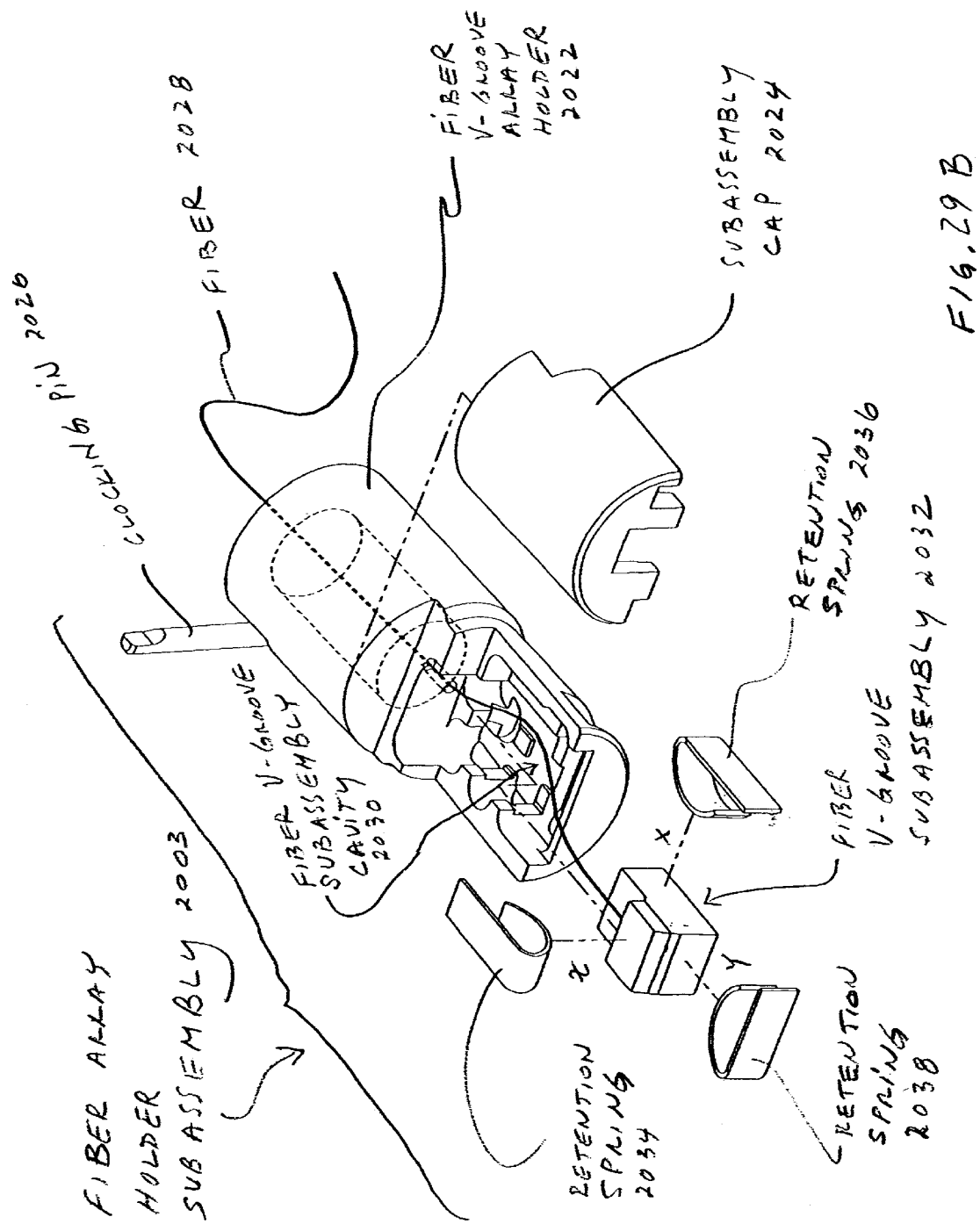
FIG. 29B is an exploded view of a fiber array holder subassembly that forms part of the collimator assembly shown in FIG. 29A.

FIG. 29B shows the fiber array holder subassembly 2003 having a fiber V-groove subassembly cavity generally indicated as 2030 for mounting a fiber V-groove subassembly generally indicated as 2032. The fiber V-groove subassembly 2032 is semi-kinematically mounted and maintained in the fiber V-groove subassembly cavity 2030 by three retention springs 2034, 2036, 2038 and the subassembly cap 2024. For example, the mounting of the fiber V-groove subassembly 2032 is characterized as follows: (1) the precision substrate of fiber V-groove array is arranged in the fiber V-groove subassembly cavity 2030; (2) The retention spring 2036 restrains the fiber V-groove subassembly 2032 in the X direction; (3) the two retention springs 2034, 2038 constrain the fiber V-groove subassembly 2032 in the Y and Z directions; and (4) the subassembly cap 2024 is welded to the fiber V-groove array holder 2022 to complete retention of the fiber V-groove subassembly 2032 in a semi-kinematic mount.

FIGS. 29C and 29D show, by way of example, the fiber V-groove subassembly 2032 having a fiber V-groove subassembly body 2040 having a V-groove 2042 arranged therein for receiving the one or more fibers 2028a, 2028b. The fiber V-groove subassembly 2032 also has a fiber V-groove subassembly cap 2048 for enclosing and holding the fibers 2028a, 2028b in the V-groove 2042, as best shown in FIG. 29D.

Figure 29E:
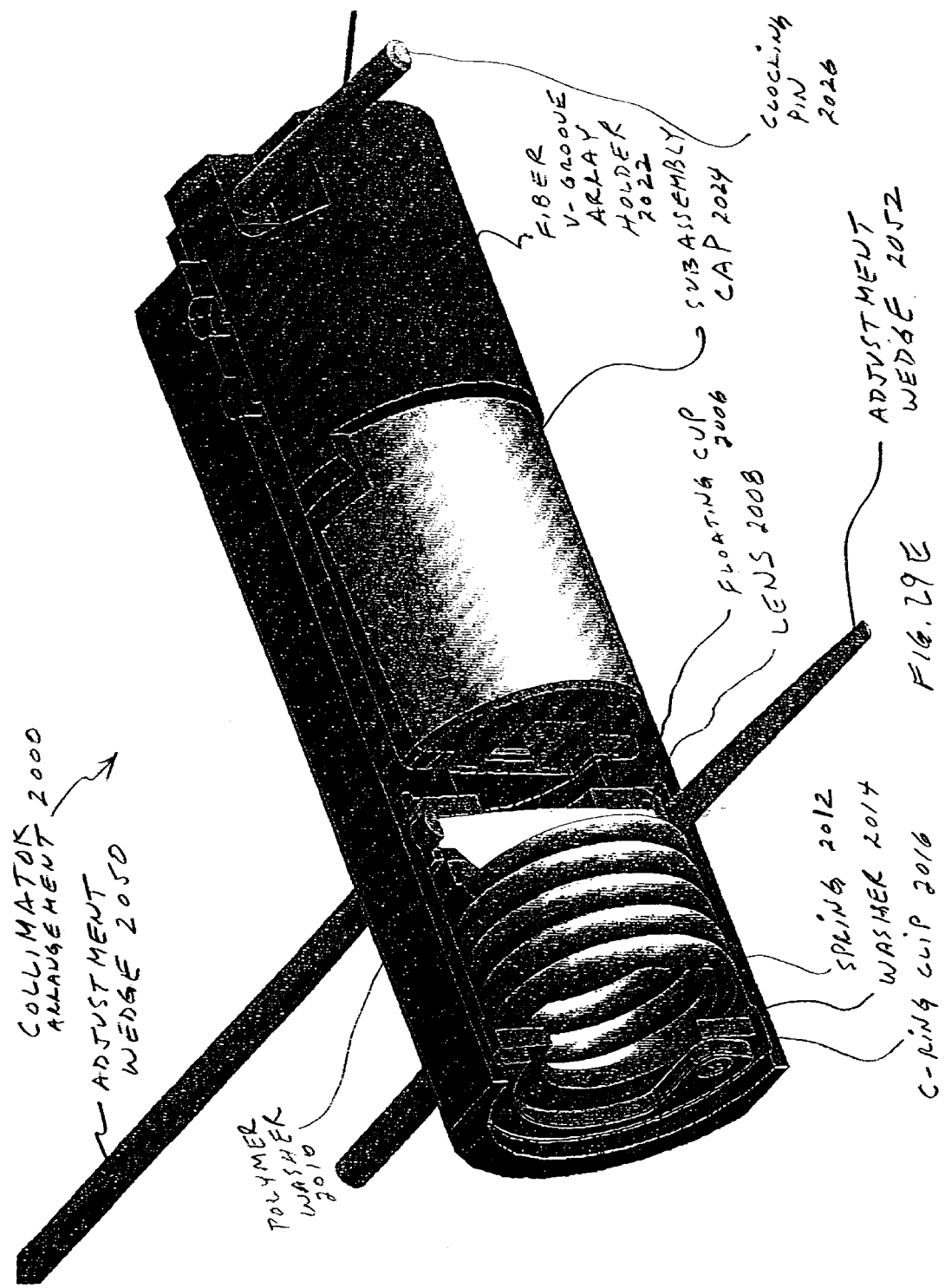
FIG. 29E is a view of a constructed collimator assembly shown in FIG. 29A.

FIG. 29E shows a complete collimator assembly generally indicated as 2000. In the complete collimator assembly 2000, the lens subassembly 2002 is welded to the fiber array holder subassembly 2003. The fully welded collimator assembly 2000 is mounted on a mounting or focusing tool or configuration (not shown) for providing coarse optical/mechanical alignment. Control of the basic mechanics of the mounting configuration is typically in the range of about +/−25 microns and about 0.1°. However, initial and final positioning of other optical components on the mounting configuration require a coarse adjustment of the actual access of the collimator assembly 2000 to match with the optical access of the other components. The coarse adjustment of the collimator optical access is achieved by moving the lens 2008 in the X and Y directions while maintaining a fixed position of the fiber array holder subassembly 2003. Tuning wedges 2050, 2052 are used to move the lens floating cap 2006 in the X and Y directions to provide coarse lens adjustment to about +/−500 microns, as discussed below. However, with use of a piezoelectric impact tool fine displacement with a resolution that is a small fraction of about a micron may be achievable.

The collimator assembly is assembled as follows:

First, the lens subassembly 2002 is assembled. The lens 2008 sits in the floating lens cup 2006. The interfaces between the floating lens cup 2006 and the precision tube of the lens housing 2004 are precision ground. The polymer washer 2014 restrains the lens 2008 in the floating lens cup 2006 under force from the compression spring 2012. The washer 2014 and the C-ring clip 2016 are used to provide a reaction surface so that the compression spring 2012 can hold the floating lens cup 2006 against the interface with the inner surface of the subassembly tube of the lens housing 2004. The lens housing has notches 2018, 2020 to accommodate use of the tuning wedges 2050, 2052. As discussed below, the tuning wedge 2050, 2052 may be inserted into the notches 2018, 2020 so as to react against the surface in order to push the floating lens cup 2006 in adjustment relative to the mechanical access of the tube of the lens housing 2004.

Next, the array holder 2022 is fit into the precision tube of the lens housing 2004 for a focus adjustment and weld. To accomplish the collimation adjustment, the array holder 2022 and the tube of the lens housing 2004 are installed into the focusing tool (not shown) along with the lens subassembly 2002. The lens subassembly 2002 is aligned and adjusted for optimum collimation. The array holder 2022 is welded to the precision tube of the lens housing 2004. At this point, the lens subassembly 2004 and the fiber array holder subassembly 2003 are a matched pair.

In operation, the collimator assembly 2000 will interface optical signals on an optical fiber with the optics of another optical device by creating a parameter-matched, free space beam; collect a returning beam from the other optical device and re-introduce it into the optical fiber with minimal loss; interface the collimator on the other optical device chassis with accuracy of about +/−25 microns and about +/−1 mR; point the free space beam into the optical access of the other optical device with a coarse adjustment of about +/−2 mR and a fine adjustment of about +/−0.002 mR. Moreover, adhesives are not allowed in the optical path and are not desired for connecting any of the precisely aligned optical/mechanical components.

One skilled in the art will appreciate that a diffraction grating has a predetermined polarization dependence loss (PDL) associated therewith. The PDL of a diffraction grating such as element 42 is dependent on the geometry of the etched grooves of the grating. Consequently, means to mitigate PDL may be desired.

By way of example, one method of mitigating the PDL for any of the embodiments described hereinbefore is to provide a $\lambda/4$ plate between the spatial light modulator 16 and the diffraction grating 24 (before or after the bulk lens 46). The fast axis of the $\lambda/4$ plate is aligned to be approximately 45 degrees to the direction or axis of the lines 42 of the diffraction grating 24. The micromirror device 18 is angled to reflect the separated channels back through the $\lambda/4$ plate to the difffraction grating. In the first pass through the $\lambda/4$ plate, the $\lambda/4$ plate circularly polarizes the separated light. When the light passes through the $\lambda/4$ plate again, the light is linearly polarized to effectively rotate the polarization of the separated channels by 90 degrees. Effectively, the $\lambda/4$ plate averages the polarization of the light to reduce or eliminate the PDL. One will appreciate that the $\lambda/4$ plate may not be necessary if the diffraction grating has low polarization dependencies, or other PDL compensating techniques are used.

Figure 30:
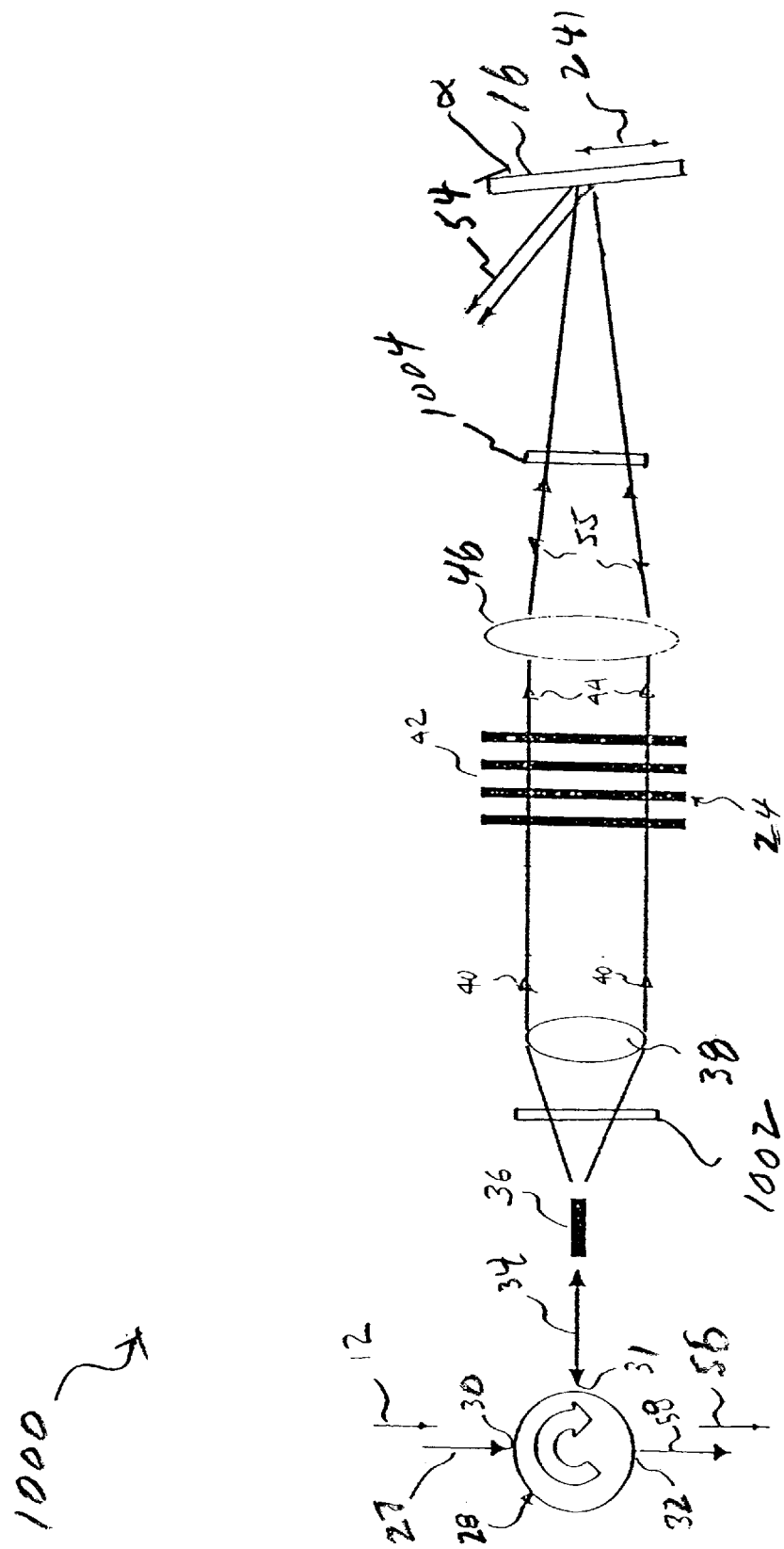
FIG. 30 shows an alternative embodiment of a cross-connect having one or more optic devices for minimizing polarization dispersion loss (PDL)

In particular, FIG. 30 shows an embodiment of a chromatic dispersion compensation device generally indicated as 1000 having optical portions 15, 16 with one or more optical PDL devices 1002, 1004 for minimizing polarization dependence loss (PDL). The one or more optical PDL devices 1002 is arranged between the capillary tube 36 and the collimator 38, while the one or more optical PDL devices 1004 is arranged between the bulk lens 46 and the spatial light modulator 16.

The optical PDL device 1002 may include a polarization splitter for splitting each channel into its pair of polarized light beams and a rotator for rotating one of the polarized light beams of each optical channel.

The one or more optical devices 1002, 1004 may be incorporated in any of the embodiments shown and described above, including but not limited to the embodiments shown in FIGS. 1, 6, 7, 10, 11, 13, 16, 23 and 27.

In effect, as a person skilled in the art will appreciate, a diffraction grating such as the optical elements 24 has a predetermined polarization dependence loss (PDL) associated therewith. The PDL of the diffraction grating 24 is dependent on the geometry of the etched grooves 42 of the grating. Consequently, means to mitigate PDL may be desired. The λ/4 plate between the spatial light modulator 16 and the diffraction grating(s) 24 (before or after the bulk lens 46) mitigates the PDL for any of the embodiments described hereinbefore. The fast axis of the λ/4 plate is aligned to be approximately 45 degrees to the direction or axis of the lines 42 of the diffraction grating 24. The mirror is angled to reflect the separated channels back through the λ/4 plate to the diffraction grating. In the first pass through the λ/4 plate, the λ/4 plate circularly polarizes the separated light. When the light passes through the λ/4 plate again, the light is linearly polarized to effectively rotate the polarization of the separated channels by 90 degrees. Effectively, the λ/4 plate averages the polarization of the light to reduce or eliminate the PDL. One will appreciate that the λ/4 plate may not be necessary if the diffraction grating has low polarization dependencies, or other PDL compensating techniques are used that are known now or developed in the future.

As shown and described herein, the polarized light beams may have a generally rectangular cross-section and are imaged at separate and distinct locations on the spatial light modulator 16, such that the polarized light beams of the optical channels do not substantially overlap spatially when focused onto the spatial light modulator, as shown, for example, in FIGS. 2, 5, 8, 9, 14, 15, 24 and 28.

Figure 31:
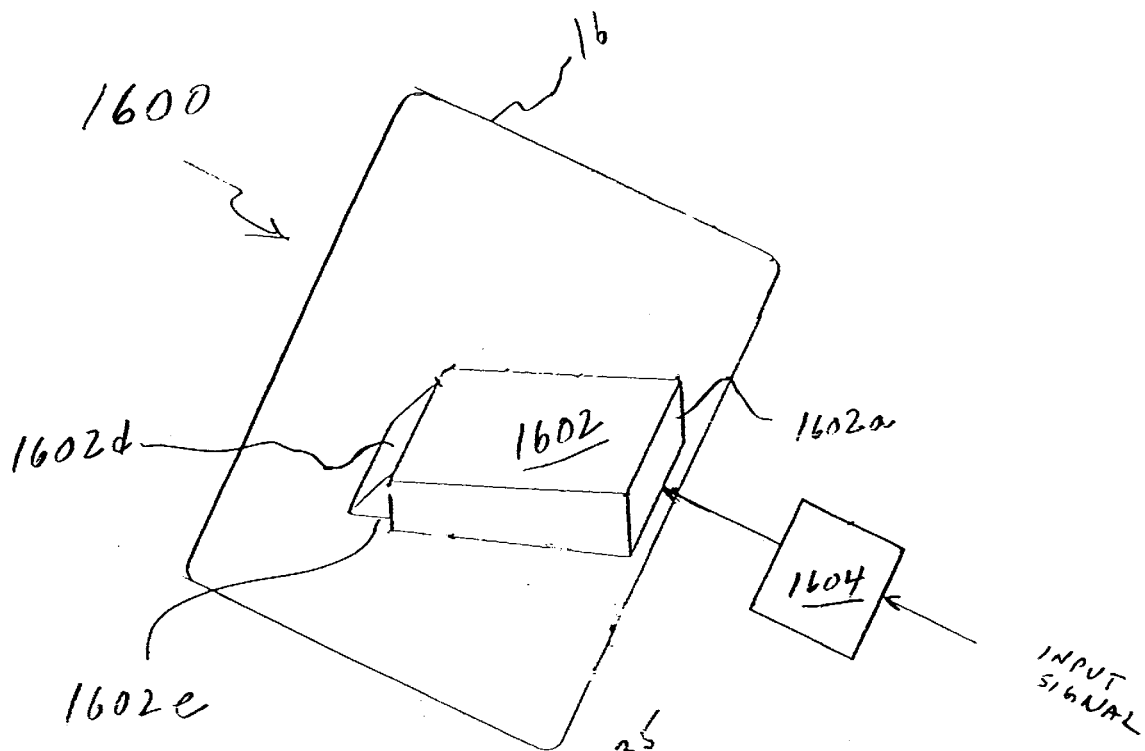
FIG. 31 shows an embodiment of a cross-connect having a chisel prism in accordance with the present invention.

FIG. 31 shows a chromatic dispersion compensation device generally indicated as 1600 similar to that shown above, except that the micromirror device is oriented such that the tilt axis 85 is perpendicular to the spectral axis 86. The chromatic dispersion compensation device 1600 has a chisel prism 1602 arranged in relation to the spatial light modulator 30 and a set of optical components 1604. The underlying configuration of the chromatic dispersion compensation device 1600 may be implemented in any of the embodiments show and described in relation to FIGS. 3, 8B, 8C and 18A described above in which the pivot or tilt axis of the mirrors of the micromirror device 30 is perpendicular to the spectral axis of the channels projected on the micromirror device 30.

The set of optical components 1604 is similar to the optical arrangements including some combination of optical elements 28, 36, 38, 42, 46, 84, 94, 102, 112, 116, 172 shown and described above in relation to the embodiments shown in, for example, FIGS. 1, 6, 7, 10, 11, 13, 23 and 27. The spatial light modulator 30 is shown and described herein as the well known micromirror device. The chisel prism 1602 has multiple faces, including a front face 1602a, a rear face 1602d and a bottom face generally indicated by 1602e. Light from the set of optical components 1604 passes through one or more faces of the chisel prism 1602, reflects off the spatial light modulator back to the chisel prism 1602, reflects off one or more internal surfaces of the chisel prism 1602 and passes back through the chisel prism 1602 and passes back to the set of optical components 1604.

The chisel prism design described herein addresses a problem in the optical art when using micromirror devices. The problem is the ability to send a collimated beam out to a reflective object and return it in manner that is insensitive to the exact angular placement of the reflective object. Because a light beam is typically collimated and spread out over a relatively large number of micromirrors, any overall tilt of the array causes the returned beam to "miss" the optical component, such as a pigtail, intended to receive the same.

The present invention provides a way to reduce the tilt sensitivity by using a classical optical design that certain combinations of reflective surfaces stabilize the reflected beam angle with respect to angular placement of the reflector. Examples of the classical optical design include a corner-cube (which stabilize both pitch and yaw angular errors) or a dihedral prism (which stabilize only one angular axis.).

One advantage of the configuration of the present invention is that it removes the tilt sensitivity of the optical system (which may comprise many elements besides a simple collimating lens such as element 38 shown and described above) leading up to the retro-reflective spatial light modulator 16. This configuration allows large beam sizes on the spatial light modulator without the severe angular alignment sensitivities that would normally be seen.

Patent application Ser. No. 10/115,647, which is hereby incorporated by reference, shows and describes the basic principal of these highly stable reflective elements in which all the surfaces of the objects being stable relative to one another, while the overall assembly of the surfaces may be tilted without causing a deviation in reflected angle of the beam that is large compared to the divergence angle of the input beam.

Figure 32:
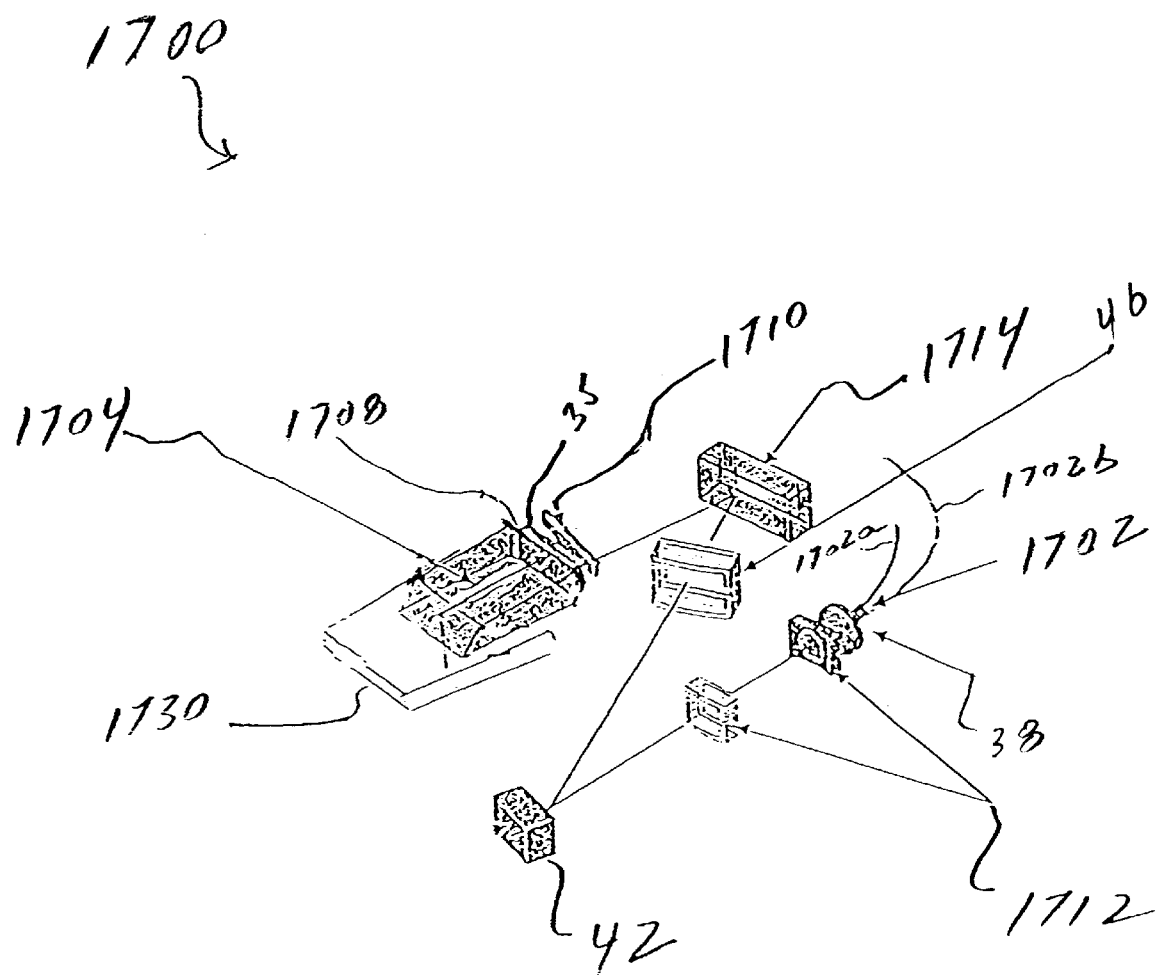
FIG. 32 shows an alternative embodiment of a cross-connect having a chisel prism in accordance with the present invention.

FIG. 32 illustrates a schematic diagram of a chromatic dispersion compensation device generally indicated as 1700 having a chisel prism 1704 that provides improved sensitivity to tilt, alignment, shock, temperature variations and packaging profile, which incorporates such a tilt insensitive reflective assembly. The scope of the invention is intended to include using the chisum prism technology described herein in any one or more of the embodiments described herein.

Similar to the embodiments described hereinbefore, and by way of example, the chromatic dispersion compensation device 1700 includes a set of optical components having a dual fiber pigtail 1702 (circulator free operation), the collimating lens 38, a bulk diffraction grating 42, a Fourier lens 46, a ¼λ plate 35, a reflector 1714 and a spatial light modulator 1730 (similar to that shown above). The dual fiber pigtail 601 includes a transmit fiber 1702a and a receive fiber 1702b. The set of optical components typically provide a optical input signal having one or more optical channels on the receive fiber 1702b, as well as providing an optical output signal on the transmit fiber 1702b.

Similar to the embodiment described above, the chisel prism 1704 has multiple internally reflective surfaces, including a top surface, and a back surface, as well as transmissive surfaces including a front surface and a bottom surface. The micro-mirror device 1730 is placed normal to the bottom surface of the chisel prism 1704, as shown. In operation, the chisel prism 1704 reflects the first optical input signal from the first set of optical components to the spatial light modulator 1730, and reflects the optical output signal back to the set of optical components.

The chisel prism 1704 decreases the sensitivity of the optical filter to angular tilts of the optics. The insensitivity to tilt provides a more rugged and robust device to shock vibration and temperature changes. Further, the chisel prism 1704 provides greater tolerance in the alignment and assembly of the optical filter 1700, as well as reduces the packaging profile of the filter. To compensate for phase delay associated with each of the total internal reflection of the reflective surfaces of the prism (which will be described in greater detail hereinafter), a λ/9 wave plate 1708 is optically disposed between the prism 1704 and λ/4 wave plate 35. An optical wedge or lens 1710 is optically disposed between the λ/4 wave plate 35 and the diffraction grating 42 for directing the output beam from the micro-mirror device 1730 to the receive pigtail 1702*a* of the dual fiber pigtail 1702*b*. The optical wedge or lens 1710 compensates for pigtail and prism tolerances. The scope of the invention is intended to cover embodiments in which the optical wedge 1710 is arranged parallel or oblique to the front surface of the wedge 1704. Moreover, as shown, these components are only arranged in relation to one front surface; however, as a person skilled in the art would appreciate, these optical components would typically be arranged in relation to any one or more front surfaces shown in FIG. 32, as well as the front surfaces in the other chisel prism embodiments shown ad described herein.

The optical device 1700 further includes a telescope 1712 having a pair of cylindrical lens that are spaced a desired focal length. The telescope 1712 functions as a spatial beam expander that expands the input beam (approximately two times) in the spectral plane to spread the collimated beam onto a greater number of lines of the diffraction grating. The telescope 1712 may be calibrated to provide the desired degree of beam expansion. The telescope advantageously provides the proper optical resolution, permits the package thickness to be relatively small, and adds design flexibility.

A folding mirror 1714 is disposed optically between the Fourier lens 46 and the λ/4 wave plate 35 to reduce the packaging size of the optical filter 1700.

Figure 33:
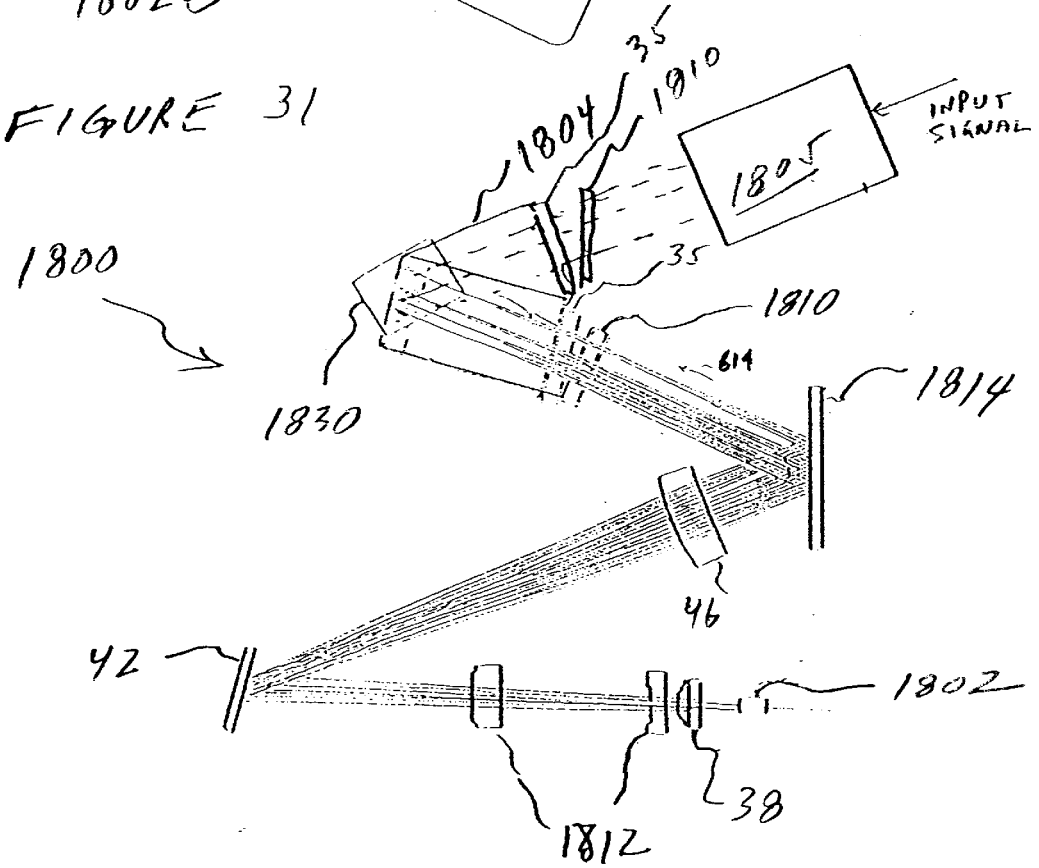
FIG. 33 shows an alternative embodiment of a cross-connect having a chisel prism in accordance with the present invention.

FIG. 33 shows another embodiment of a tilt-insensitive reflective assembly 1800 having a specially shaped prism 1804 arranged in relation to the micro-mirror device 1830, a set of optical components as shown and a compliment set of optical components generally indicated as 1805 consistent with that discussed above.

Unlike an ordinary 45 degree total internal reflection (TIR) prism, in this embodiment the back surface of the chisel prism 1704 is cut at approximately a 48 degree angle relative to the bottom surface of the chisel prism 1704. The top surface of the chisel prism 1704 is cut at a 4 degree angle relative to the bottom surface to cause the light to reflect off the top surface via total internal reflection. The front surface of the chisel prism 1704 is cut at a 90 degree angle relative to the bottom surface. The chisel prism 1704 therefore provides a total of 4 surface reflections in the optical assembly (two TIRs off the back surface, one TIR off the micromirror device 1730, and one TIR off the top surface.)

In order to remove the manufacturing tolerances of the prism angles, a second smaller compensating prism or wedge 1810 (or wedge), having a front surface cut at a shallow angle (e.g., as 10 degrees) with respect to a back surface, may also be used. Slight tilting or pivoting about a pivot point of the compensation wedge 1810 causes the light beam to be pointed in the correct direction for focusing on the receive pigtail 1802.

The combination of the chisel prism 1804 and the compensation wedge 1810 allows for practical fabrication of optical devices that spread a beam out over a significant area and therefore onto a plurality of micromirrors, while keeping the optical system robust to tilt errors introduced by vibration or thermal variations.

In FIG. 34, the input light rays 1826*a* first pass through the λ/4 wave plate 35 and the λ/9 wave plate 1840. The input rays 1826*a* reflect off the back surface 1821 of the prism 1804 the micro-mirror device 1830. The rays 1826*b* then reflect off the micromirror device 1830 back to the back surface 1821 of the prism 1804. The rays 1826*b* then reflect off the top surface 1822 for a total of 4 surfaces (an even number) and passes through the front surface 1823 of the prism 1804. The rays 1826*b* then pass back through the λ/4 wave plate 35 and the λ/9 wave plate 1840 to the wedge 1810. The wedge 1810 redirects the output rays 1826*c* to the receive pigtail 1802. As shown by arrows 1851, the wedge 1810 may be pivoted about its long axis 1850 during assembly to slightly steer the output beam 1826*c* to the receive pigtail 1802 with minimal optical loss by removing manufacturing tolerances of the chisel prism.

In FIG. 33, the prism 1804 (with wave plates 35, 1840 mounted thereto) and the micro-mirror device 1830 are mounted or secured in fixed relations to each other. The prism 1804 and micro-mirror device 1830 are tilted a predetermined angle off the axis of the input beam 614 (e.g., approximately 9.2 degrees) to properly direct the input beam onto the micromirrors of the micromirror device, as described hereinbefore. The wedge 1810 however is perpendicular to the axis of the input beam 1826*a*. Consequently, the receive pigtail of the dual fiber pigtail 1802 is rotated a predetermined angle (approximately 3 degrees) from a vertically aligned position with the transmit pigtail. Alternatively, the wedge 1810 may be rotated by the same predetermined angle as the prism and the micromirror device (e.g., approximately 9.2 degrees) from the axis of the input beam. As a result, the receive pigtail of the dual pigtail assembly 1802 may remain vertically aligned with transmit pigtail.

Scope of the Invention

While the micromirrors 20 may switch discretely from the first position to the second position, as described hereinabove, the micromirrors may move continuously (in an "analog" mode) or in discrete steps between the first position and second position. In the "analog" mode of operation the micromirrors can be tilted in a continuous range of angles. The ability to control the angle of each individual mirror has the added benefit of much more attenuation resolution than in the digital control case. In the "digital" mode, the attenuation step resolution is determined by the number of micromirrors 20 illuminated by each channel. In the "analog" mode, each mirror can be tilted slightly allowing fully continuous attenuation of the return beam. Alternatively, some combination of micromirrors may be switched at a predetermined or selected pulse width modulation to attenuate the optical channel or band.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

The present invention also contemplates, not only tilting the micromirror device about a spectral axis, as described hereinbefore, but tilting the micromirror device along a spatial axis to provide a fixed or "DC" amount of time delay over the spectrum of the channels.

While the section of the input channels are described as spectral sections, one will recognize that each optical channel may be divided into spatial sections that extend across the spectral width of the channels.

Although the invention has been described as using an array of digital micro-mirrors to implement the pixelating device in the embodiments shown herein, it should be understood by those skilled in the art that any pixelating device that provides pixelated optical signal processing may be used, as described further below. Further, instead of using micro-mirrors with two reflective states or angles of reflection (e.g., +/−10 degrees) as a pixel that reflects a portion of the light beam, the pixels may have one reflective state and the other state may be absorptive or transmissive. Alternatively, instead of the pixel having at least one state being reflective (which may provide other design advantages), the pixel may have one state being transmissive and the other state being absorptive. Alternatively, the pixel may have two transmissive or partially transmissive states that refract the incoming light out at two different angles. For each of various pixelating devices, the optics surrounding the pixelating device would be changed as needed to provide the same functions as that described for each of the embodiments herein for the different type of pixelated optical signal processing used.

Also, instead of the pixels having a square, diamond or rectangular shape, the pixels may have any other two or three-dimensional shapes, i.e., circle, oval, sphere, cube, triangle, parallelogram, rhombus, trapezoid.

One pixelating device, for example, may include liquid crystal technology, such as a liquid crystal display (LCD). An LCD may provide a device having either one absorptive state and one reflective state, or one absorptive state and one transmissive state. The underlying principle of an LCD is the manipulation of polarized light (i.e., an optical channel). For example, the polarized light may be rotated by 90 degrees in one state of the liquid crystal and not rotated in another state. To provide an LCD having one absorptive state and one transmissive state, a polarizer is provided at each side of the liquid crystal, such that the polarization angles of the polarizers are offset by 90 degrees. A mirror can be added at one end to provide an LCD having one absorptive state and one reflective state.

One example of having a reflective state and a transmissive state is a variation on existing bubble jet technology currently produced by Agilent and Hewlett-Packard Co., and described in U.S. Pat. Nos. 6,160,928 and 5,699,462, respectively. In that case, when the bubble is in one state, it has total internal reflection; and when in the other state, it is totally transmissive. Also in that case, the pixels may not be square but circular or oval.

One example of having a transmissive state and an absorptive state is Heterojunction Acoustic Charge Transport (HACT) Spatial Light Modulator (SLM) technology, such as that described in U.S. Pat. No. 5,166,766, entitled "Thick Transparent Semiconductor Substrate, Heterojunction Acoustic Charge Transport Multiple Quantum Well Spatial Light Modulator", Grudkowski et al and U.S. Pat. No. 5,158,420, entitled "Dual Medium Heterojunction Acoustic Charge Transport Multiple Quantum Well Spatial Light Modulator" to Grudkowski et al, provided the material used for the HACT SLM will operate at the desired operational wavelength. In that case, the pixels may be controlled by charge packets that travel along a surface acoustic wave that propagates along the device, where the size of the charge controls the optical absorption.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

We claim:

1. A chromatic dispersion compensation device for receiving an optical signal having one or more optical channels, characterized in that the chromatic dispersion compensation device comprises a spatial light modulator having a micro-mirror device with an array of micro-mirrors for selectively reflecting a respective spectral portion of a plurality of spectral bands or sections of the one or more channels to compensate each channel for chromatic dispersion.

2. A chromatic dispersion compensation device according to claim 1, wherein the array of micro-mirrors selectively delays by a desired time period the respective spectral portion of the plurality of spectral bands or sections of each respective optical channel of the optical signal.

3. A chromatic dispersion compensation device according to claim 2, wherein the chromatic dispersion compensation device comprises an optical arrangement for providing the optical signal along an optical path to the array of micro-mirrors.

4. A chromatic dispersion compensation device according to claim 3, wherein the optical arrangement is a free optics arrangement and the desired time period is delayed by increasing or decreasing the optical path that each spectral portion of the plurality of spectral bands or sections of each respective optical channel propagates in free space.

5. A chromatic dispersion compensation device according to claim 1, wherein the spatial light modulator is programmable for reconfiguring the chromatic dispersion compensation device to compensate each channel for chromatic dispersion by changing a switching algorithm that drives the array of micro-mirrors.

6. A chromatic dispersion compensation device according to claim 1, wherein the array of micro-mirrors includes a multiplicity of micro-mirrors that are separately controllable for tilting on an axis depending on a control signal in accordance with a switching algorithm.

7. A chromatic dispersion compensation device according to claim 1, wherein the optical signal is a wavelength division multiplexed (WDM) optical signal having a plurality of wavelengths and a corresponding plurality of optical channels, each optical channel reflecting off a respective group of micro-mirrors of the micro-mirror device.

8. A chromatic dispersion compensation device according to claim 5, wherein the spatial light modulator is selectively reconfigurable by statically or dynamically modifying the switching algorithm to accommodate different channel spacing, the shape of the light beam, or the center wavelength of the light beam of the optical signal.

9. A chromatic dispersion compensation device according to claim 5, wherein the switching algorithm is based on the wavelength of the optical signal and the one or more optical channels being compensated for chromatic dispersion.

10. A chromatic dispersion compensation device according to claim 1, wherein each micro-mirror is tiltable in either a first position or a second position along an axis either substantially parallel to the spectral axis of the optical input signal, parallel to the spatial axis of the optical input signal, or at an angle of 45 degrees in relation to the spatial axis.

11. A chromatic dispersion compensation device according to claim 3, wherein the optical arrangement includes a free optics arrangement that provides the optical signal to the spatial light modulator, and also provide a compensated optical signal having each channel compensated for chromatic dispersion from the spatial light modulator.

12. A chromatic dispersion compensation device according to claim 11, wherein the free optics arrangement includes either one or more circulators, one or more waveguides, or a combination thereof.

13. A chromatic dispersion compensation device according to claim 12, wherein the one or more circulators includes a pair of circulators.

14. A chromatic dispersion compensation device according to claim 12, wherein the one or more waveguides includes a pair of capillary tubes.

15. A chromatic dispersion compensation device according to claim 13, wherein the one or more circulators includes a three port circulator.

16. A chromatic dispersion compensation device according to claim 11, wherein the free optics arrangement includes a respective optical portion for each channel.

17. A chromatic dispersion compensation device according to claim 11, wherein the free optics arrangement includes a collimator, a reflective surface, a dispersion element, a bulk lens, or a combination thereof.

18. A chromatic dispersion compensation device according to claim 17, wherein the collimator includes either an aspherical lens, an achromatic lens, a doublet, a GRIN lens, a laser diode doublet, or a combination thereof.

19. A chromatic dispersion compensation device according to claim 17, wherein the reflective surface includes a mirror.

20. A chromatic dispersion compensation device according to claim 19, wherein the reflective surface is curved.

21. A chromatic dispersion compensation device according to claim 17, wherein the bulk lens includes a Fourier lens.

22. A chromatic dispersion compensation device according to claim 1, wherein the one or more optical channels have a desired cross-sectional geometry, including an elliptical, a rectangular, a square or a polygonal shape.

23. A chromatic dispersion compensation device according to claim 5, wherein the spatial light modulator is configured so one group of optical channels is spaced at 100 GHz and another group of optical channels is spaced at 50 GHz.

24. A chromatic dispersion compensation device according to claim 11, wherein the free optics arrangement further comprise a further optical portion for receiving a reflected optical signal from the spatial light modulator and providing a re-reflected or dispersed optical signal back to the spatial light modulator.

25. A chromatic dispersion compensation device according to claim 24, wherein the further optical portion includes a light dispersion element for dispersing the reflected optical signal and providing a dispersed optical signal back to the spatial light modulator.

26. A chromatic dispersion compensation device according to claim 24, wherein the further optical portion includes a reflective surface for re-reflecting the reflected optical signal back to the spatial light modulator for delaying each respective spectral portion or section to compensate each channel for chromatic dispersion.

27. A chromatic dispersion compensation device according to claim 11, wherein the free optics arrangement includes one or more optical PDL mitigating devices for minimizing polarization dependence loss (PDL).

28. A chromatic dispersion compensation device according to claim 27, wherein one optical PDL mitigating device is arranged between a waveguide and a grating in the optical arrangement, and another optical PDL mitigating device is arranged between a grating and the spatial light modulator.

29. A chromatic dispersion compensation device according to claim 27, wherein the one or more optical PDL mitigating devices include a pair of optical PDL mitigating devices.

30. A chromatic dispersion compensation device according to claim 27, wherein the one or more optical PDL mitigating devices includes one optical PDL mitigating device having a polarization splitter for splitting each channel into a pair of polarized light beams and a rotator for rotating one of the polarized light beams of each optical channel.

31. A chromatic dispersion compensation device according to claim 30, wherein the one or more optical PDL mitigating devices includes another optical PDL mitigating device having a rotator for rotating one of the previously rotated and polarized light beams of each optical channel and a polarization splitter for combining the pair of polarized light beams of each channel.

32. A chromatic dispersion compensation device according to claim 27, wherein the one or more optical PDL mitigating devices includes a $\lambda/4$ plate.

33. A chromatic dispersion compensation device according to claim 17, wherein the dispersion element has a low PDL.

34. A chromatic dispersion compensation device according to claim 11, wherein the optical arrangement includes a chisel prism having multiple faces for modifying the direction of the optical signal.

35. A chromatic dispersion compensation device according to claim 34, wherein the multiple faces include at least a front face, a rear face, a top face and a bottom face.

36. A chromatic dispersion compensation device according to claim 34, wherein the optical light from the free optics arrangement passes through one or more faces of the chisel prism, reflects off one or more internal surfaces of the chisel prism, reflects off the spatial light modulator, again reflects off the one or more internal surfaces of the chisel prism, and passes back to the free optics arrangement.

37. A chromatic dispersion compensation device according to claim 1, wherein the optical signal includes a plurality of channels, each having at least one respective spectral band or section.

38. A chromatic dispersion compensation device according to claim 1, wherein the optical signal includes at least one channel having respective spectral bands or sections arranged in non-uniform spectral arrays on the array of micro-mirror.

39. A chromatic dispersion compensation device according to claim 38, wherein the non-uniform spectral arrays include arrays having a different length, width, number or combination thereof on the array of micro-mirrors.

40. A chromatic dispersion compensation device according to claim 1, wherein the optical signal includes a plurality of channels that are non-linearly disposed on the array of micro-mirrors.

41. A chromatic dispersion compensation device according to claim 17, wherein the dispersion element includes a diffraction grating, a tilted grating, an echelle grating, an etalon, a prism or a holographic optical device.

42. A chromatic dispersion compensation device according to claim 11, wherein the optical arrangement includes a field correction lens for respectively compensating for the one or more channels reflecting of the spatial light modulator.

43. A chromatic dispersion compensation device according to claim 24, wherein the further optical portion includes a mirror for re-reflecting the optical signal back to the spatial light modulator.

44. A chromatic dispersion compensation device according to claim 24, wherein the further optical portion includes a second light dispersion element for re-dipersing the optical signal back to the spatial light modulator.

* * * * *